United States Patent
Liu et al.

(10) Patent No.: US 11,756,334 B2
(45) Date of Patent: Sep. 12, 2023

(54) FACIAL EXPRESSION RECOGNITION

(71) Applicant: QUALCOMM Incorporated, San Diego, CA (US)

(72) Inventors: Peng Liu, San Diego, CA (US); Lei Wang, San Diego, CA (US); Kuang-Man Huang, Zhubei (TW); Michel Adib Sarkis, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 17/185,811

(22) Filed: Feb. 25, 2021

(65) Prior Publication Data
US 2022/0269879 A1  Aug. 25, 2022

(51) Int. Cl.
G06V 40/16 (2022.01)
G06N 3/08 (2023.01)
G06F 18/214 (2023.01)

(52) U.S. Cl.
CPC .......... *G06V 40/174* (2022.01); *G06F 18/214* (2023.01); *G06N 3/08* (2013.01); *G06V 40/171* (2022.01)

(58) Field of Classification Search
CPC ............. G06V 40/174; G06V 2201/12; G06V 10/806; G06V 10/82; G06V 40/169; G06F 18/214; G06N 3/08
See application file for complete search history.

(56) References Cited

U.S. PATENT DOCUMENTS

| | | | |
|---|---|---|---|
| 2015/0035825 A1* | 2/2015 | Zhou | G06T 7/251 345/419 |
| 2019/0130600 A1* | 5/2019 | Lin | G06T 7/75 |
| 2019/0333262 A1* | 10/2019 | Chen | G06V 40/172 |
| 2020/0051303 A1* | 2/2020 | Li | G06N 3/045 |
| 2021/0327116 A1* | 10/2021 | Wei | G06T 17/20 |
| 2022/0270314 A1* | 8/2022 | Navarro | G06V 10/24 |

OTHER PUBLICATIONS

Chaudhuri et al. Personalized face modeling for improved face reconstruction and motion retargeting. In Computer Vision-ECCV 2020: 16th European Conference, Glasgow, UK, Aug. 23-28, 2020, Proceedings, Part V 16 (pp. 142-160). Springer International Publish (Year: 2020).*

International Search Report and Written Opinion—PCT/US2022/013371—ISA/EPO—dated May 4, 2022.

(Continued)

*Primary Examiner* — Edward F Urban
*Assistant Examiner* — Wassim Mahrouka
(74) *Attorney, Agent, or Firm* — Polsinelli/Qualcomm

(57) ABSTRACT

Systems and techniques are provided for facial expression recognition. In some examples, a system receives an image frame corresponding to a face of a person. The system also determines, based on a three-dimensional model of the face, landmark feature information associated with landmark features of the face. The system then inputs, to at least one layer of a neural network trained for facial expression recognition, the image frame and the landmark feature information. The system further determines, using the neural network, a facial expression associated with the face.

27 Claims, 21 Drawing Sheets

(56) References Cited

OTHER PUBLICATIONS

Jannat S., et al., "Subject Identification Across Large Expression Variations Using 3D Facial Landmarks", Feb. 21, 2021 (Feb. 21, 2021), Computer Vision—ECCV 2020 :16th European Conference, Glasgow, UK, Aug. 23-28, 2020 : Proceedings, [Lecture Notes in Computer Science ISSN 0302-9743], pp. 5-13, XP047577348, ISBN: 978-3-030-58594-5, figure 1.

Jung H., "Joint Fine-Tuning in Deep Neural Networks for Facial Expression Recognition", 2015 IEEE International Conference on Computer Vision (ICCV), IEEE, Dec. 7, 2015 (Dec. 7, 2015) pp. 2983-2991, XP032866646, DOI: 10.1109/ICCV.2015.341 [retrieved on Feb. 17, 2016]Abstract, Figure 1, Sections 2.2, 3.1, 3.2.

Kittler J., et al., "Conformal Mapping of a 3D Face Representation onto a 2D Image for CNN Based Face Recognition", 2018 International Conference on Biometrics (ICB), IEEE, Feb. 20, 2018 (Feb. 20, 2018), pp. 124-131, XP033374957, DOI:10.1109/ICB2018.2018.00029 [retrieved on Jul. 13, 2018], Abstract.

Lewis J. P., et al., "Practice and Theory of Blendshape Facial Models", Eurographics 2014, State of the Art Report, Jan. 1, 2014 (Jan. 1, 2014), 20 Pages, XP055562475, DOI: 10.2312/egst.20141042, [retrieved on Feb. 27, 2019], Abstract.

Li S., et al., "Deep Facial Expression Recognition: A Survey", IEEE Transactions on Affective Computing, Jan. 1, 2020 (Jan. 1, 2020), pp. 1-20, XP055913310, DOI: 10.1109/TAFFC.2020.2981446, Abstract.

Sacha B., et al., "Modul: Deep Modal and Dual Landmark-Wise Gated Network for Facial Expression Recognition", 2020 15th IEEE International Conference on Automatic Face and Gesture Recognition (FG 2020), IEEE, Nov. 16, 2020 (Nov. 16, 2020), pp. 153-159, XP033880102, DOI: 10.1109/FG47880.2020.00081, [Retrieved on Jan. 11, 2021] Abstract p. 1, Figure 1.

Wang Sa., et al., "Leveraging 3D Blendshape for Facial Expression Recognition Using CNN", Science China Information Sciences, Science China Press, Beijing, vol. 63, No. 2, Jan. 16, 2020 (Jan. 16, 2020), 3 Pages, XP036994321, ISSN: 1674-733X, DOI: 10.1007/S11432-019-2747-Y [retrieved on Jan. 16, 2020] abstract figure 1.

* cited by examiner

Training; No landmark feature information
Accuracy = .86

Training: Landmark image frames
Accuracy = .88

Training; No landmark feature
Accuracy = .86

Training: Blendshape coefficients
Accuracy = .88

Training; Landmark image frames
Accuracy = .87

1010

| 1 | 1 | 1 | 0 | 0 |
|---|---|---|---|---|
| 0 | 1 | 1 | 1 | 0 |
| 0 | 0 | 1 | 1 | 1 |
| 0 | 0 | 1 | 1 | 0 |
| 0 | 1 | 1 | 0 | 0 |

| 1 | 0 | 1 |
|---|---|---|
| 0 | 1 | 0 |
| 1 | 0 | 1 |

FIG. 10B

FACIAL EXPRESSION RECOGNITION

FIELD

The present disclosure is related to facial expression recognition. More specifically, the present disclosure relates to improving facial expression recognition systems based on implementing techniques for facial landmark detection in neural networks trained for facial expression recognition.

BACKGROUND

Many devices and systems allow a scene to be captured by generating images (or frames) and/or video data (including multiple frames) of the scene. For example, a camera or a computing device including a camera (e.g., a mobile device such as a mobile telephone or smartphone including one or more cameras) can capture a sequence of frames of a scene. The image and/or video data can be captured and processed by such devices and systems (e.g., mobile devices, IP cameras, etc.) and can be output for consumption (e.g., displayed on the device and/or other device). In some cases, the image and/or video data can be captured by such devices and systems and output for processing and/or consumption by other devices.

An image can be processed (e.g., using face or object detection, recognition, segmentation, etc.) to determine any objects or people that are present in the image, which can be useful for many applications. For instance, a model can be determined for recognizing facial expressions of people captured in the image, and can be used to facilitate effective operation of various applications and systems. Examples of such applications and systems include augmented reality (AR), artificial reality (AI), Internet-of-Things (IoT) devices, security systems (e.g., vehicular safety systems), emotion recognition systems, in addition to many other applications and systems.

SUMMARY

Systems and techniques are described herein that can be implemented for improved facial expression recognition. According to at least one example, apparatuses are provided for improved facial expression recognition. An example apparatus can include a memory (or multiple memories) and a processor or multiple processors (e.g., implemented in circuitry) coupled to the memory (or memories). The processor (or processors) is configured to: receive an image frame corresponding to a face of a person; determine, based on a three-dimensional model of the face, landmark feature information associated with landmark features of the face; input, to at least one layer of a neural network trained for facial expression recognition, the image frame and the landmark feature information; and determine, using the neural network, a facial expression associated with the face.

Another example apparatus can include: means for receiving an image frame corresponding to a face of a person; means for determining, based on a three-dimensional model of the face, landmark feature information associated with landmark features of the face; means for inputting, to at least one layer of a neural network trained for facial expression recognition, the image frame and the landmark feature information; and means for determining, using the neural network, a facial expression associated with the face.

In another example, methods for improved facial expression recognition are provided. An example method can include receiving an image frame corresponding to a face of a person. The method can also include determining, based on a three-dimensional model of the face, landmark feature information associated with landmark features of the face. The method can include inputting, to at least one layer of a neural network trained for facial expression recognition, the image frame and the landmark feature information. The method can further include determining, using the neural network, a facial expression associated with the face.

In another example, non-transitory computer-readable media are provided for improved facial expression recognition. An example non-transitory computer-readable medium can store instructions that, when executed by one or more processors, cause the one or more processors to: determine, based on a three-dimensional model of the face, landmark feature information associated with landmark features of the face; input, to at least one layer of a neural network trained for facial expression recognition, the image frame and the landmark feature information; and determine, using the neural network, a facial expression associated with the face.

In some aspects, the landmark feature information can include one or more blendshape coefficients determined based on the three-dimensional model. In some examples, the method, apparatuses, and computer-readable medium described above can include: generating the three-dimensional model of the face; and determining the one or more blendshape coefficients based on a comparison between the three-dimensional model of the face and image data corresponding to the face within the image frame. In one example, the method, apparatuses, and computer-readable medium described above can include inputting the one or more blendshape coefficients to a fully-connected layer of the neural network. Further, in some cases, the fully connected layer can concatenate the one or more blendshape coefficients with data output by a convolutional layer of the neural network.

In some aspects, the method, apparatuses, and computer-readable medium described above can include generating, using the one or more blendshape coefficients, a landmark image frame indicating one or more landmark features of the face. For example, the method, apparatuses, and computer-readable medium described above can include: determining, based on the one or more blendshape coefficients, a plurality of landmark features of the face; determining a subset of the plurality of landmark features that correspond to key landmark features; and generating the landmark image frame based on forming one or more connections between the subset of the plurality of landmark features that correspond to the key landmark features. In one example, the method, apparatuses, and computer-readable medium described above can include determining the subset of the plurality of landmark features that correspond to the key landmark features based on determining landmark features relevant to facial expressions of people. Further, the landmark image frame can include a binary image frame that indicates pixels corresponding to the key landmark features using a predetermined pixel value.

In some aspects, the method, apparatuses, and computer-readable medium described above can include inputting the landmark image frame to one or more layers of the neural network. For example, the method, apparatuses, and computer-readable medium described above can include: inputting a first version of the landmark image frame to a first layer of the neural network, the first version of the landmark image frame having a first resolution; and inputting a second version of the landmark image frame to a second layer of the neural network occurring after the first layer, the second version of the landmark images frame having a second resolution that is lower than the first resolution. In one example, the first and second layers of the neural network can be convolutional layers. Further, the neural network can include a pooling layer between the first layer and the second layer. The pooling layer can be configured to: downsample activation data output by the first layer to the second resolution of the second version of the landmark image frame; receive the second version of the landmark image frame; and pass the downsampled activation data output by the first layer and the second version of the landmark image frame to the second layer.

In some aspects, the method, apparatuses, and computer-readable medium described above can include training the neural network using a set of training data. The set of training data can include: a plurality of image frames corresponding to a plurality of faces of people, the plurality of image frames being labeled with facial expressions associated with the plurality of faces of people; and a plurality of landmark feature information associated with the plurality of image frames.

In some aspects, the three-dimensional model can include a three-dimensional morphable model (3DMM).

In some aspects, the method, apparatuses, and computer-readable medium described above can include using a camera system to capture the image frame corresponding to the face of the person.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, a vehicle (e.g., an autonomous vehicle), or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 10A, FIG. 10B, and FIG. 10C are diagrams illustrating a simple example of a convolution, in accordance with some examples;

DETAILED DESCRIPTION

Figure 1:
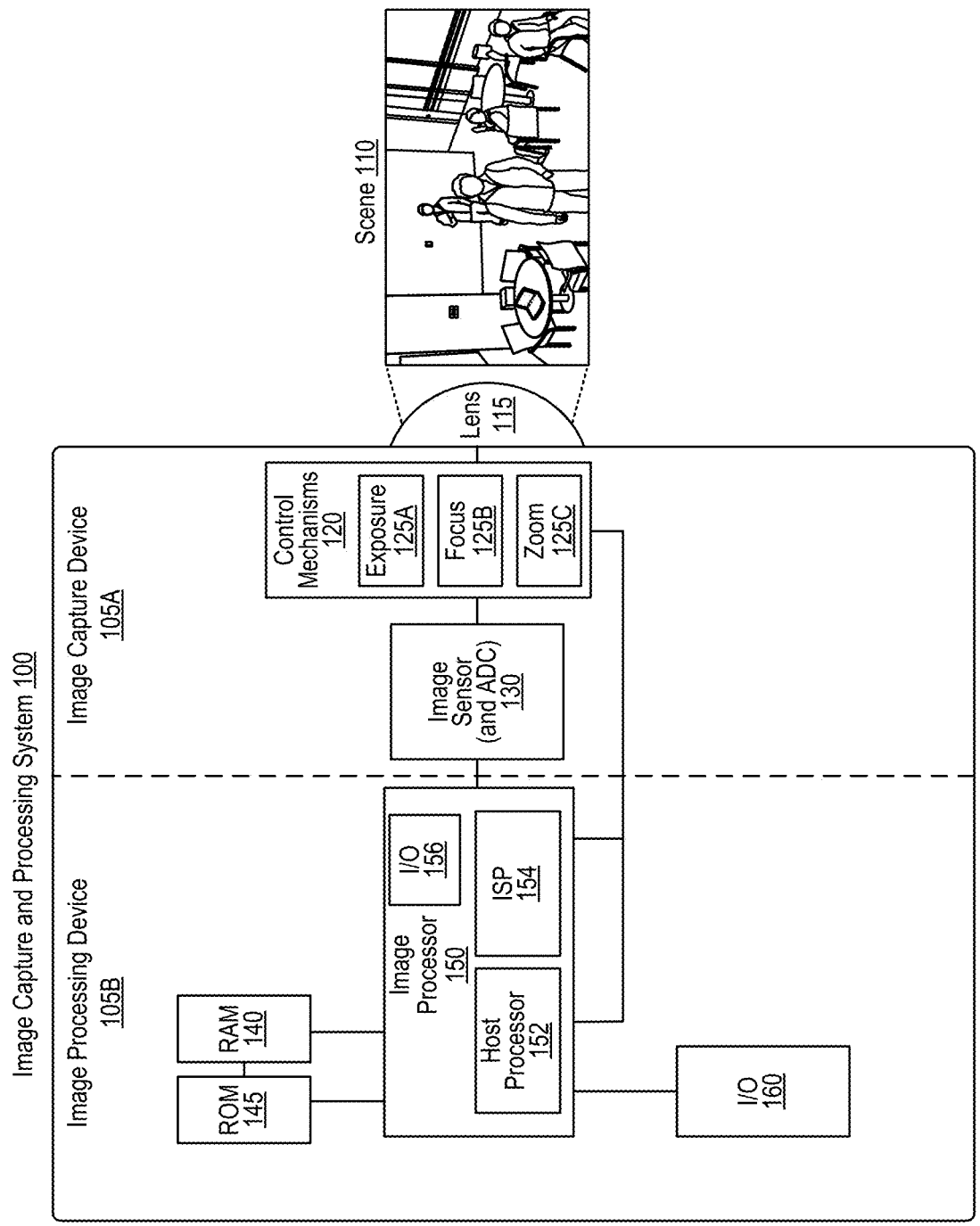
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Facial expression recognition and facial landmark detection are two important tasks that can be performed by facial analysis systems. Facial expression recognition involves automatic classification and/or estimation of facial expressions depicted in image frames.

Facial landmark detection involves localizing key (e.g., important or relevant) facial points in image frames. Key facial points can include a corner of an eye, a corner of a mouth, the tip of a nose, among other facial points. The locations of detected facial landmarks can characterize and/or indicate the shape of a face (and the shape of one or more facial features, such as a nose or mouth). In some cases, facial expression recognition and facial landmark detection can enable computer-implemented systems (e.g., machine learning models) to determine and/or infer human characteristics such as behavior, intent, and/or emotion. While related, facial expression recognition and facial landmark detection are generally implemented for separate tasks, and output different types of information.

The present disclosure describes systems, apparatuses, methods, and computer-readable media (collectively referred to as "systems and techniques") for improving facial expression recognition. The systems and techniques can provide the ability for a facial expression recognition system to utilize facial landmark detection techniques, which can result in more accurate and/or efficient facial expression recognition. For example, the facial expression recognition system can use a three-dimensional morphable model (3DMM) technique (such as a blendshape technique) to determine information associated with landmark features of an image frame (referred to as landmark feature information). The facial expression recognition system can use the landmark feature information as input to a neural network trained to perform facial expression recognition. In some examples, the landmark feature information can enable the neural network to more effectively determine regions of the image frame that are relevant and/or important for recognizing facial expressions. Thus, utilizing landmark feature information in neural networks trained for facial expression recognition can improve the accuracy of the expression classifications output by the neural networks (e.g., without requiring an increase in processing time and/or power).

Further details regarding facial expression recognition are provided herein with respect to various figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1220, read-only memory (ROM) 145/1225, a cache 1212, a memory unit 1215, another storage device 1230, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1235, any other input devices 1245, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames. The host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, de-mosaicing, color conversion, correction or enhancement/suppression of image attributes, denoising filters, sharpening filters, among others. The settings of different modules of the ISP 154 can be configured by the host processor 152. Each module may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

Figure 2:
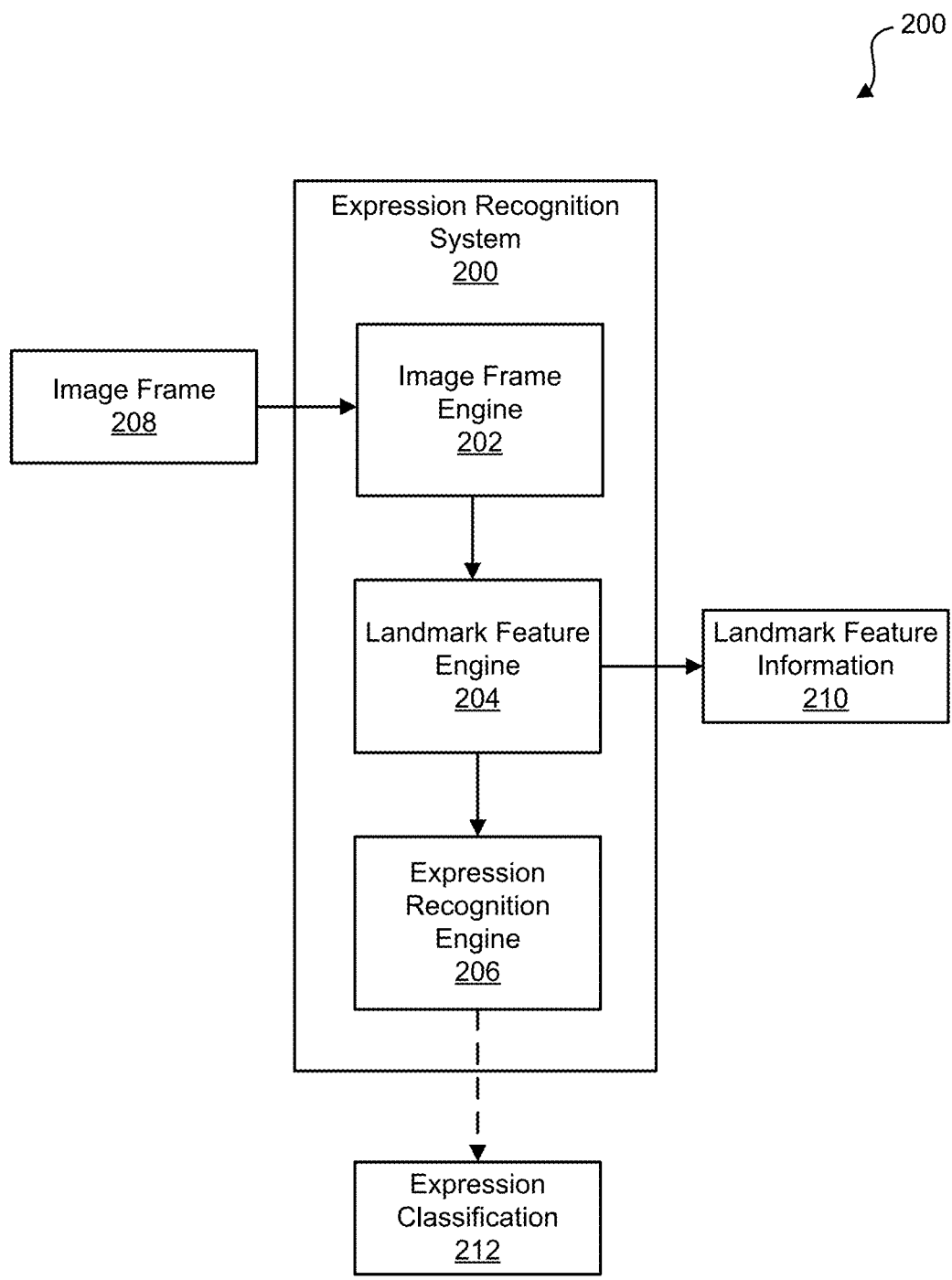
FIG. 2 is a block diagram illustrating an example architecture of an expression recognition system, in accordance with some examples.

FIG. 2 is a block diagram illustrating an example of an expression recognition system 200. In some embodiments, the expression recognition system 200 can be implemented by the image capture and processing system 100 illustrated in FIG. 1. For example, the expression recognition system 200 can be implemented by the image processor 150, the image sensor 130, and/or any additional component of the image capture and processing system 100. The expression recognition system 200 can be implemented by any additional or alternative computing device or system. As shown, the expression recognition system 200 can include one or more engines, including an image frame engine 202, a landmark feature engine 204, and an expression recognition engine 206. As will be explained in more detail below, one or more of the engines of the expression recognition system 200 can correspond to and/or include a machine learning model (e.g., a deep neural network) trained to perform facial expression recognition.

In one example, the image frame engine 202 can receive an image frame 208 captured by an image sensor (e.g., the image sensor 130) of the expression recognition system 200. The image frame 208 can be a color image frame (e.g., an RGB image frame), a grayscale image frame, an infrared (IR) image frame, a near infrared (NIR) image frame, or any other type of image frame. In some examples, receiving the image frame 208 can initiate and/or be part of a facial expression recognition process. For example, in response to receiving the image frame 208, the image frame engine 202 can pass the image frame 208 to the landmark feature engine 204 and/or the expression recognition engine 206 in order to determine one or more facial expressions (e.g., an expression classification 212) associated with the image frame 208. In some cases, the expression recognition system 200 can implement a facial expression recognition process based on one or more techniques for facial landmark detection. As used herein, "facial landmark detection" (or simply "landmark detection") is a task of detecting landmark features within image data corresponding to human faces. A landmark feature can include any point, location, and/or region of an image frame associated with all or a portion of a facial feature. For example, a landmark feature can indicate and/or be associated with the corner of a mouth, the corner of an eye, the boundary of a lip, an upper curve of a cheek, the tip of a nose, among other facial features. In some examples, a facial feature can be associated with and/or defined by multiple landmark features (e.g., 10, 20, 30, etc. landmark features). In some cases, facial landmark detection can involve detecting key landmark features (e.g., features with relatively high importance and/or relevance for a task). While facial landmark detection and facial expression recognition are both techniques used by facial analysis systems, these techniques generally involve separate operations and/or output different results. For example, many existing facial expression recognition processes may not utilize any techniques for facial landmark detection.

As shown in FIG. 2, the landmark feature engine 204 can determine landmark feature information 210 associated with the image frame 208. The landmark feature information 210 can include any information that indicates and/or is based on one or more landmark features of the image frame 208. In one example, the landmark feature information 210 can include information obtained using a system for generating a three-dimensional model, such as a three-dimensional morphable model (3DMM) system. As used herein, a 3DMM system can include any type or form of generative model for creating, adjusting, animating, manipulating, and/or modeling faces and/or heads (e.g., human faces and/or heads). As used herein, a model generated by a 3DMM system can be referred to as a 3D head model (or a 3DMM). In one example, a 3DMM system can generate a 3D head model that exhibits a particular facial expression. The 3D head model can be based on image data captured by a camera system and/or computer-generated image data.

In some examples, a 3DMM system can utilize blendshape tools to morph and/or model regions of a 3D head model. The deformation caused to a 3D head model by a blendshape tool can be adjusted by adjusting one or more blendshape coefficients associated with the tool. As used herein, a blendshape coefficient can correspond to an approximate semantic parametrization of all or a portion of a facial expression. For example, a blendshape coefficient can correspond to a complete facial expression, or correspond to a "partial" (e.g., "delta") facial expression. Examples of partial expressions include raising one eyebrow, closing one eyes, moving one side of the face, etc. In one example, an individual blendshape coefficient can approximate a linearized effect of the movement of an individual facial muscle.

Figure 3A:
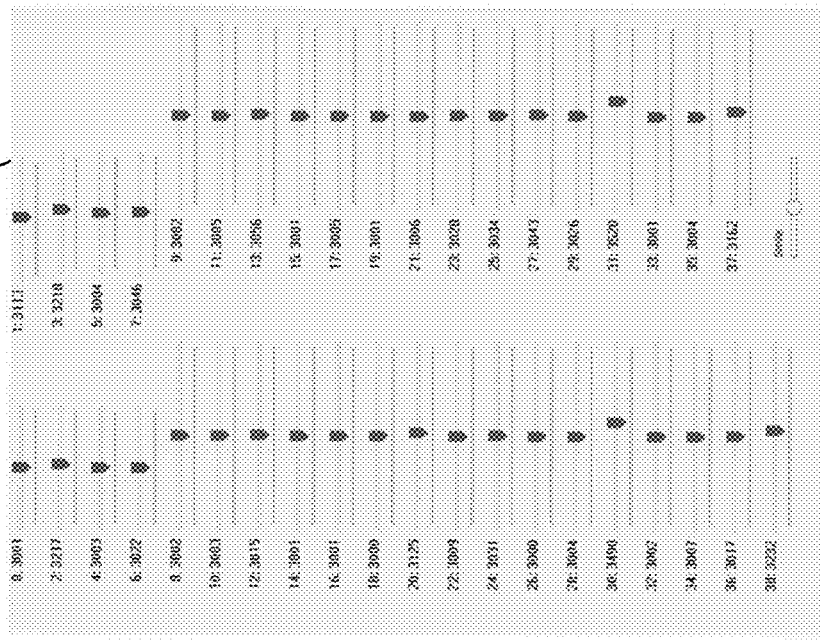
FIG. 3A and FIG. 3B are illustrations of example head models generated by three-dimensional morphable models (3DMMs), in accordance with some examples.
Figure 3A:
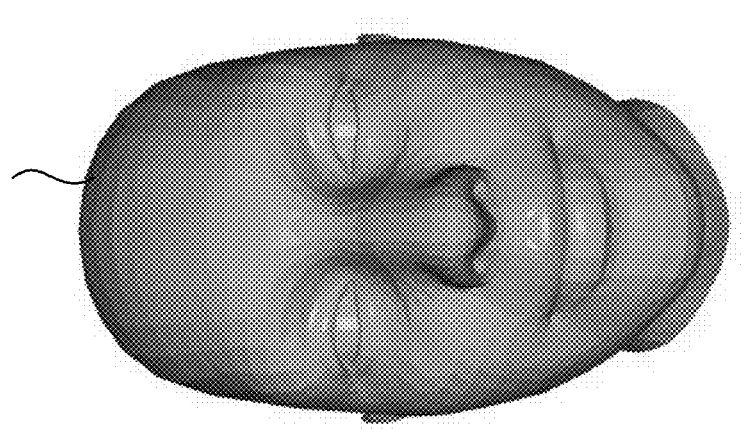

In some cases, a 3DMM system can efficiently (e.g., with relatively low processing power) adjust the facial expression of a 3D head model by varying one or more blendshape coefficients associated with the 3D head model. For example, FIG. 3A shows an example 3D head model 302 that can be generated by a 3DMM system. In this example, a user can adjust the facial expression of the 3D head model 302 by adjusting the position of one or more slider controls 306. Each slider control can be associated with a blendshape (e.g., blendshapes 0-37, as indicated in FIG. 3A). In this example, blendshape coefficients of the blendshapes are represented as values between 0 and 6000, with a value of 3000 corresponding to a neutral facial expression and values of 0 and 6000 corresponding to maximum deviations from a neutral facial expression. It is noted that the original output includes a value range from −3 to 3. The output shown in FIG. 3A is normalized to a range of values from 0 to 6000 for better resolution. Blendshape coefficients can be represented in any additional manner, such as by percentages and/or floating point numbers between 0.0 and 1.0. As the user adjusts one or more of the slider controls 306, the 3DMM system can adjust the blendshape coefficients accordingly, resulting in a corresponding adjustment of the facial expression of the 3D head model 302.

In one example, blendshape coefficients can be include identify coefficients and/or facial expression coefficients. The identify coefficients can represent facial features associated with (e.g., unique to) a particular face. The facial expression coefficients can represent variations in facial features associated with various facial expressions (e.g., generic facial expressions not associated with a particular face). In an illustrative example, a 3D model of the headshape of a person can be determined using the equation $S = \bar{S} + A_{id}\alpha_{id} + A_{exp}\alpha_{exp}$, where S is the overall 3D head shape of the person, $\bar{S}$ is the mean face shape of the person, $A_{id}$ are eigenvectors (e.g., principal components) determined based on training the model using 3D face scans of the person with a neutral expression, $\alpha_{id}$ is a shape coefficient associated with the neutral expression, $A_{exp}$ are eigenvectors determined based on training the model using offsets between 3D face scans of the person with various facial expression and the 3D face scans of the person with the neutral expression, and $\alpha_{exp}$ are facial expression coefficients associated with the various generic facial expressions.

Figure 3B:
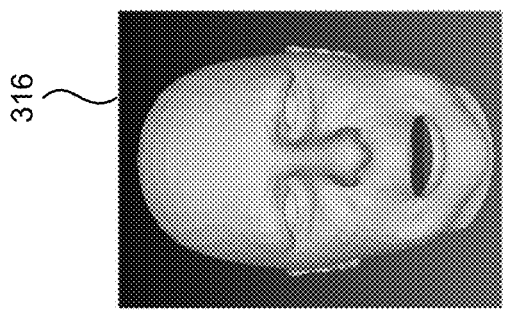
Figure 3B:
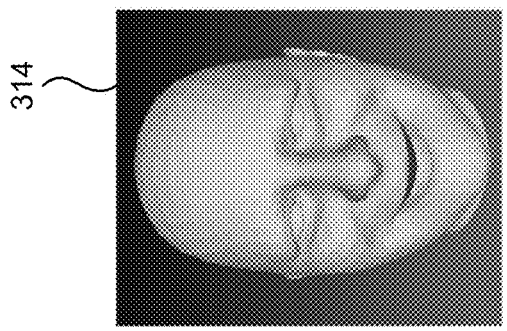
Figure 3B:
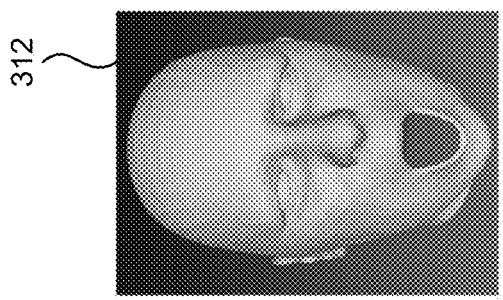
Figure 3B:
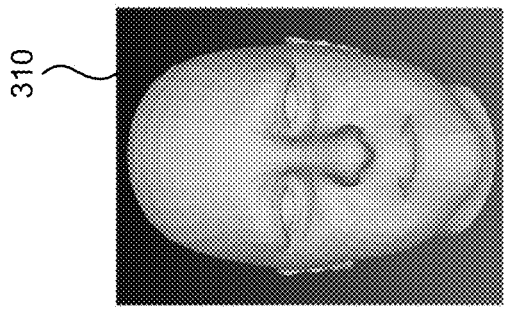

Based on identity coefficients associated with a particular person (e.g., eigenvectors $A_{id}$ in the equation above), a 3DMM system can transform a generic 3D head model into a 3D head model for the particular person. Further, based on a facial expression coefficient associated with a particular facial expression (e.g., $\alpha_{exp}$ in the equation above), a 3DMM system can transform a generic 3D head model into a 3D head model representing the particular facial expression. FIG. 3B provides an example of various 3D head models that can be generated and/or transformed by a 3DMM using various types of blendshape coefficients. For example, a model 310 illustrates a generic 3D head model with a neutral expression, a model 312 illustrates the model 310 transformed to represent a surprised facial expression, a model 314 illustrates the model 310 transformed to represent a happy facial expression (e.g., a smile), and a model 316 illustrates the model 310 transformed to represent a disgusted facial expression.

Returning to FIG. 2, the landmark feature information 210 can include one or more blendshape coefficients associated with the image frame 208. In some cases, these blendshape coefficients can represent variations between the location of facial features of face of the person within the image frame 208 and the location of corresponding facial features of a 3D head model of the person with a neutral expression. For example, the landmark feature engine 204 can detect the face of the person within the image frame 208 (e.g., based on one or more object detection algorithms, object recognition algorithms, face detection algorithms, face recognition algorithms, or any other recognition and/or detection algorithm). The landmark feature engine 204 can compare image data corresponding to the face of the person with a 3D head model of the face of the person. Based on the comparison, the landmark feature engine 204 can determine a set of blendshape coefficients corresponding to the facial expression associated with the face of the person.

In one example, the determined blendshape coefficients can represent all or a portion of the landmark feature information 210. In other examples, the landmark feature information 210 can include a landmark image frame generated based on the blendshape coefficients. In some examples, a landmark image frame can indicate and/or represent one or more key landmark features of a face of a person within an image frame. To generate a landmark image frame, the landmark feature engine 204 can determine a plurality of landmark features associated with the image frame 208 based on the blendshape coefficients. For instance, the blendshape coefficients can indicate locations within the image frame 208 corresponding to various landmark features.

Figure 3C:
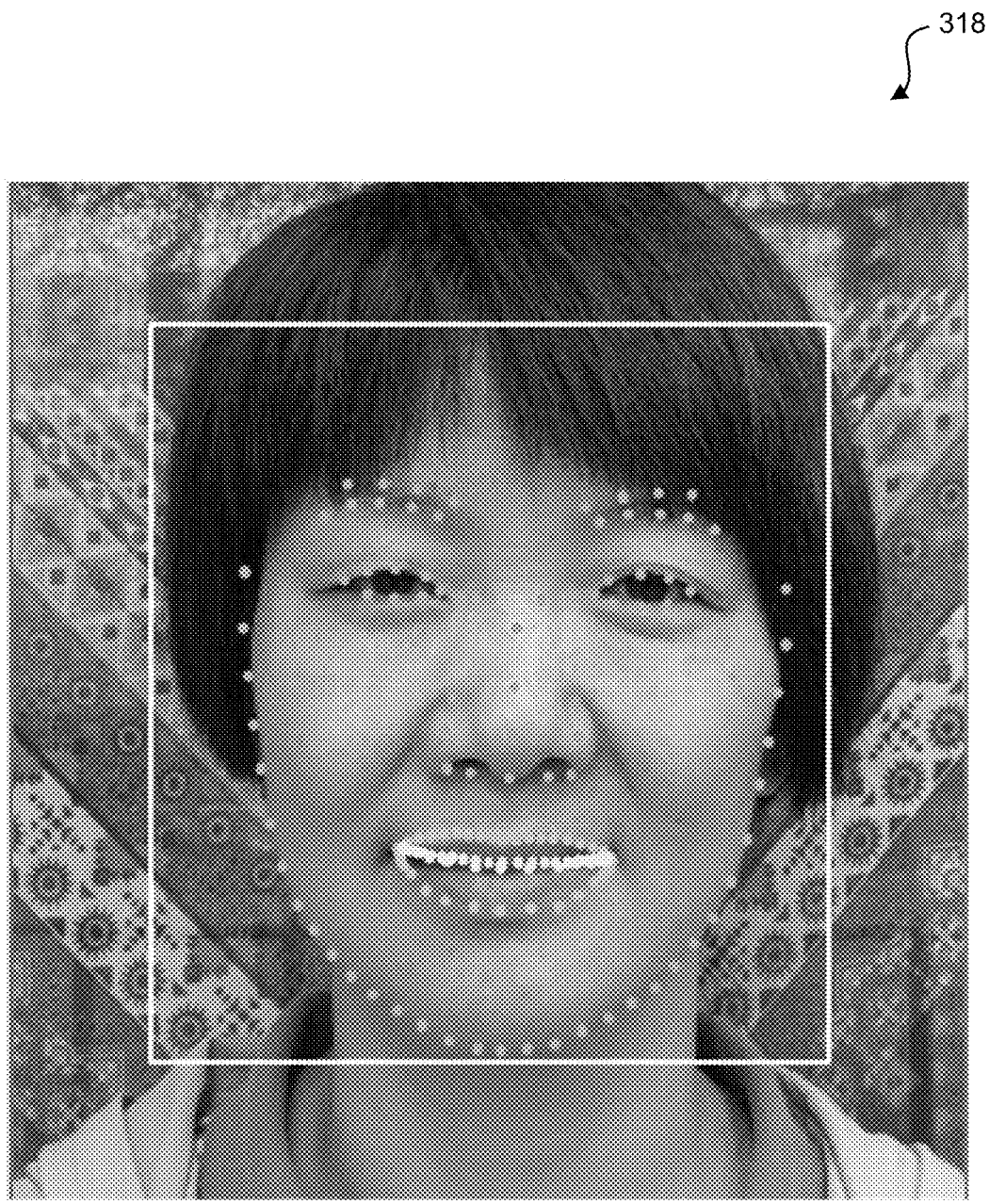
FIG. 3C is an illustration of example landmark features associated with an image frame, in accordance with some examples.

FIG. 3C shows an example image frame 318 that displays a plurality of landmark features that can be determined by the landmark feature engine 204 based on a set of blendshape coefficients. In this example, the landmark features determined by the landmark feature engine 204 are illustrated as dots overlaid on image data corresponding to the face of the person within the image frame 318. The landmark feature engine 204 can determine any number of landmark features associated with the face of the person. For instance, the landmark feature engine 204 can determine 100 landmark features, 200 landmark features, or 300 landmark features. In some cases, the landmark feature engine 204 can generate a landmark image frame by determining a subset of landmark features that correspond to key landmark features. As used herein, key landmark features can correspond to landmark features with a high degree of relevance (e.g., relevance above a threshold relevance) to facial expressions of people. In some cases, the landmark feature engine 204 can determine relevant landmark features by determining landmark features that are particularly indicative of a person's facial expression (e.g., compared to other landmark features). For example, landmark features associated certain facial features (such as a person's eyes, nose and/or mouth) may vary more in structure, appearance, and/or location between different facial expressions than landmark features associated with other facial features (such as a person's chin or forehead). Thus, the landmark feature engine 204 can determine that variable (and therefore relevant) landmark features are key landmark features.

In some cases, the landmark feature engine 204 can generate a landmark image frame based on forming one or more connections between key landmark features. For instance, the landmark feature engine 204 can determine lines, curves, boundaries, and/or shapes that define one or more facial features associated with the key landmark features. The landmark feature engine 204 can plot these connections to generate a landmark image frame. In an illustrative example, the landmark image frame can be a binary image frame (e.g., a black and white image frame) that indicates connections between key landmark features using pixels set to one pixel value. Further, in some examples, the landmark feature engine 204 can generate a landmark image frame using certain types and/or subsets of blendshape coefficients. For instance, the landmark feature engine 204 can generate a landmark image frame using landmark features determined based on facial expression blendshape coefficients (rather than identity blendshape coefficients). In some cases, facial features associated with identity blendshape coefficients can be unnecessary for facial expression recognition. Thus, disregarding identity blendshape coefficients when generating landmark image frames can simplify and/or expedite the facial expression recognition process. Further, in some examples, the landmark feature engine 204 can account for the rotation (e.g., orientation and/or angle) of a face of a person when generating landmark image frames. For instance, the landmark feature engine 204 can generate a "rotated" landmark image that represents 3D characteristics of a face. However, in other examples, the landmark feature engine 204 can generate a "frontal" landmark image frame that represents two-dimensional (2D) characteristics of a face.

Figure 3D:
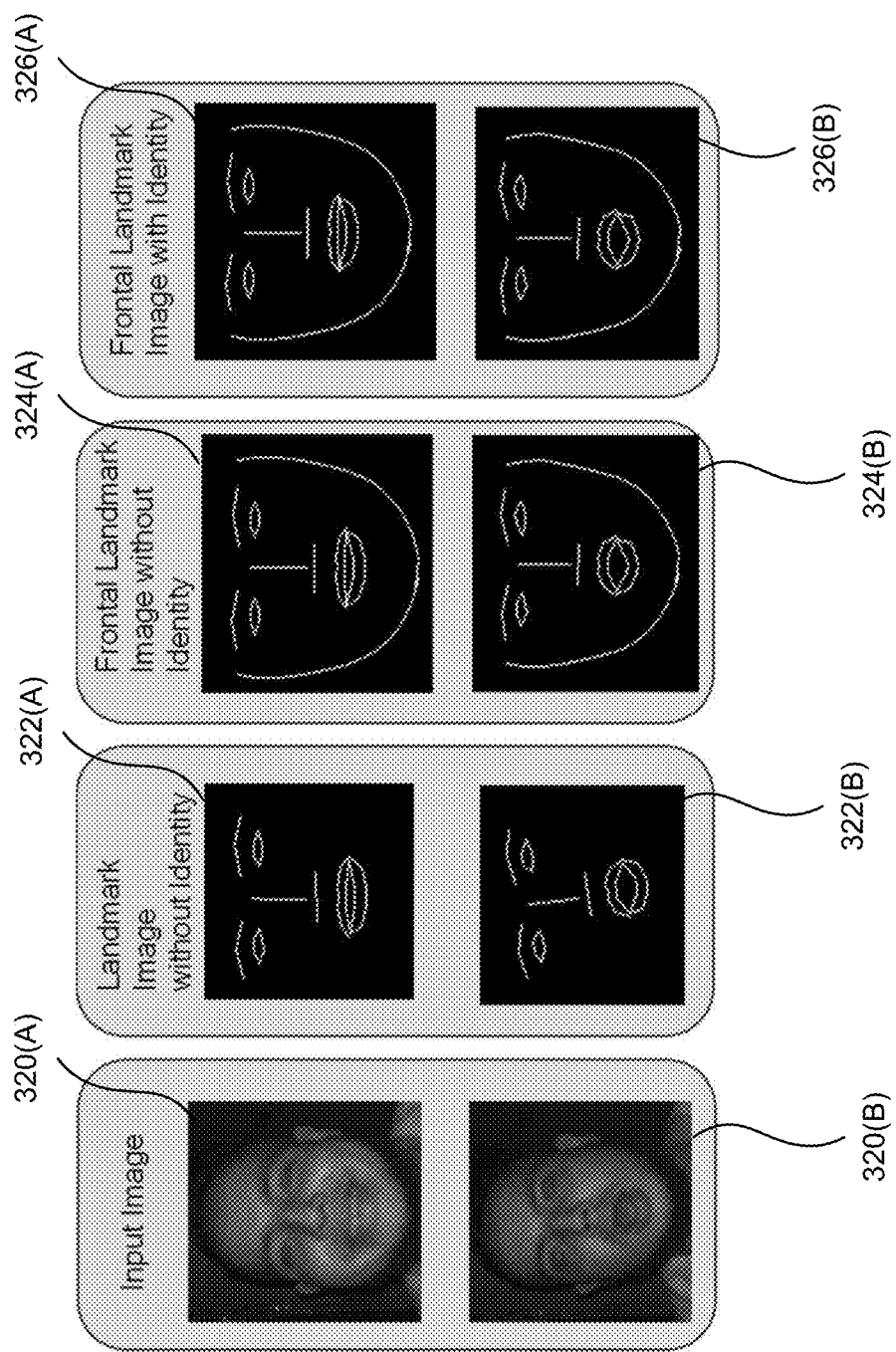
FIG. 3D and FIG. 3E are illustrations of example landmark image frames, in accordance with some examples.
Figure 3E:
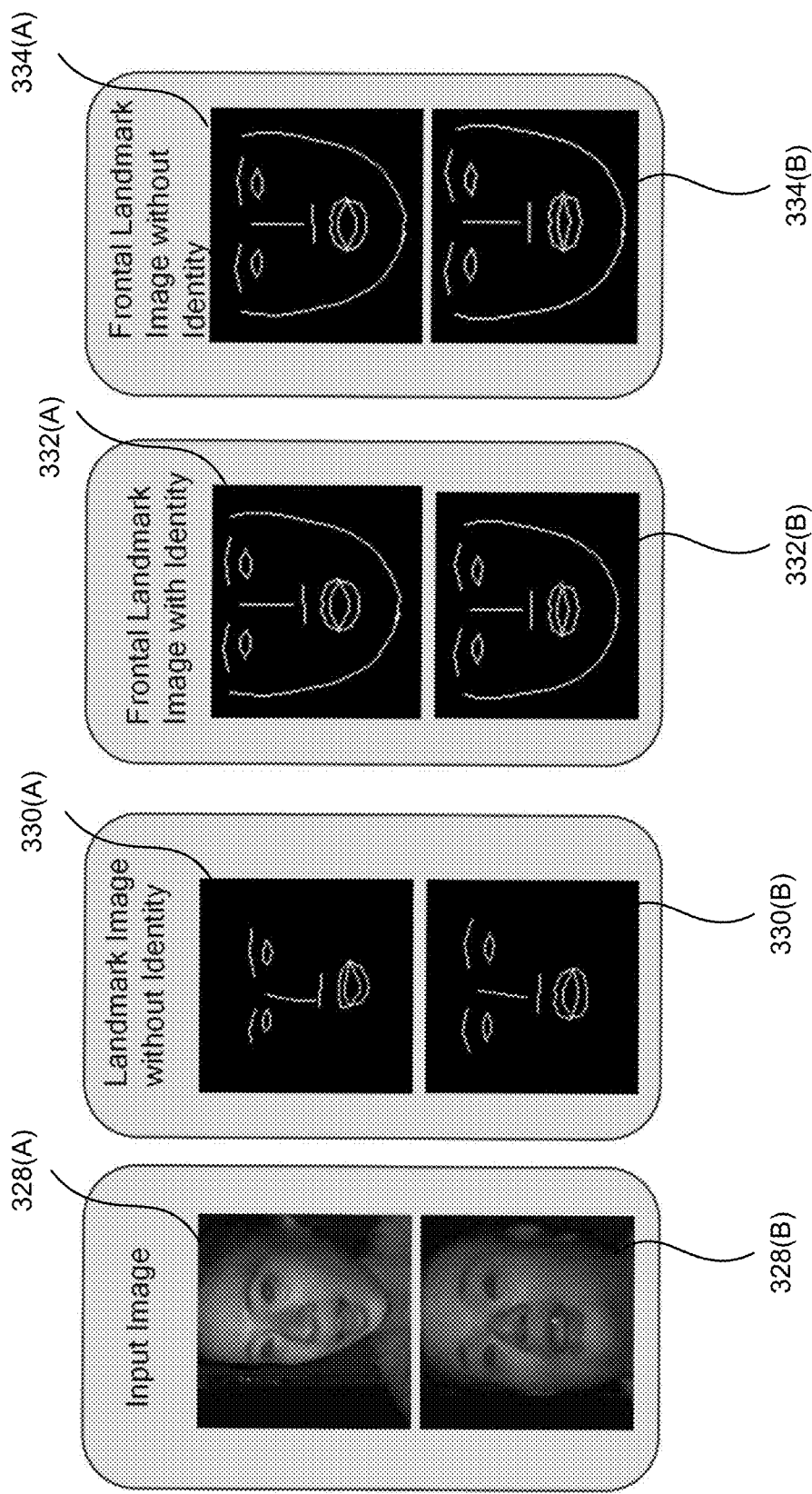

FIG. 3D and FIG. 3E illustrate various examples of landmark image frames that can be generated by the landmark feature engine 204. For example, FIG. 3D illustrates landmark image frames generated based on an image frame 320(A) and an image frame 320(B). Image frames 320(A) and 320(B) represent images of the face of the same person displaying different facial expressions. A landmark image frame 322(A) corresponds to a rotated landmark image frame generated based on facial expression blendshape coefficients (and not identity blendshape coefficients) associated with the image frame 320(A). A landmark image frame 324(A) corresponds to a frontal landmark image frame generated based on facial expression blendshape coefficients (and not identity blendshape coefficients) associated with the image frame 320(A). Further, a landmark image frame 326(A) corresponds to a frontal landmark image frame generated based on both facial expression blendshape coefficients and identity blendshape coefficients associated with the image frame 320(A). Landmark image frames 322(B), 324(B), and 326(B) are corresponding landmark image frames generated based on blendshape coefficients associated with the image frame 320(B). As shown, the landmark image frames generated based on the image frame 320(A) are distinct from the landmark image frames generated based on the image frame 320(B).

FIG. 3E illustrates landmark image frames generated based on an image frame 328(A) and an image frame 328(B). Image frames 328(A) and 328(B) represent images of two different people (e.g., people with different mean face shapes). A landmark image frame 330(A) corresponds to a rotated landmark image frame generated based on facial expression blendshape coefficients (and not identity blendshape coefficients) associated with the image frame 328(A). A landmark image frame 332(A) corresponds to a frontal landmark image frame generated based on both facial expression blendshape coefficients and identify blendshape coefficients) associated with the image frame 328(A). Further, a landmark image frame 334(A) corresponds to a frontal landmark image frame generated based on facial expression blendshape coefficients (and not identity blendshape coefficients) associated with the image frame 320(A). Landmark image frames 330(B), 332(B), and 334(B) are corresponding landmark image frames generated based on blendshape coefficients associated with the image frame 328(B). As shown, the landmark image frames generated based on the image frame 328(A) are distinct from the landmark image frames generated based on the image frame 328(B).

Figure 3F:
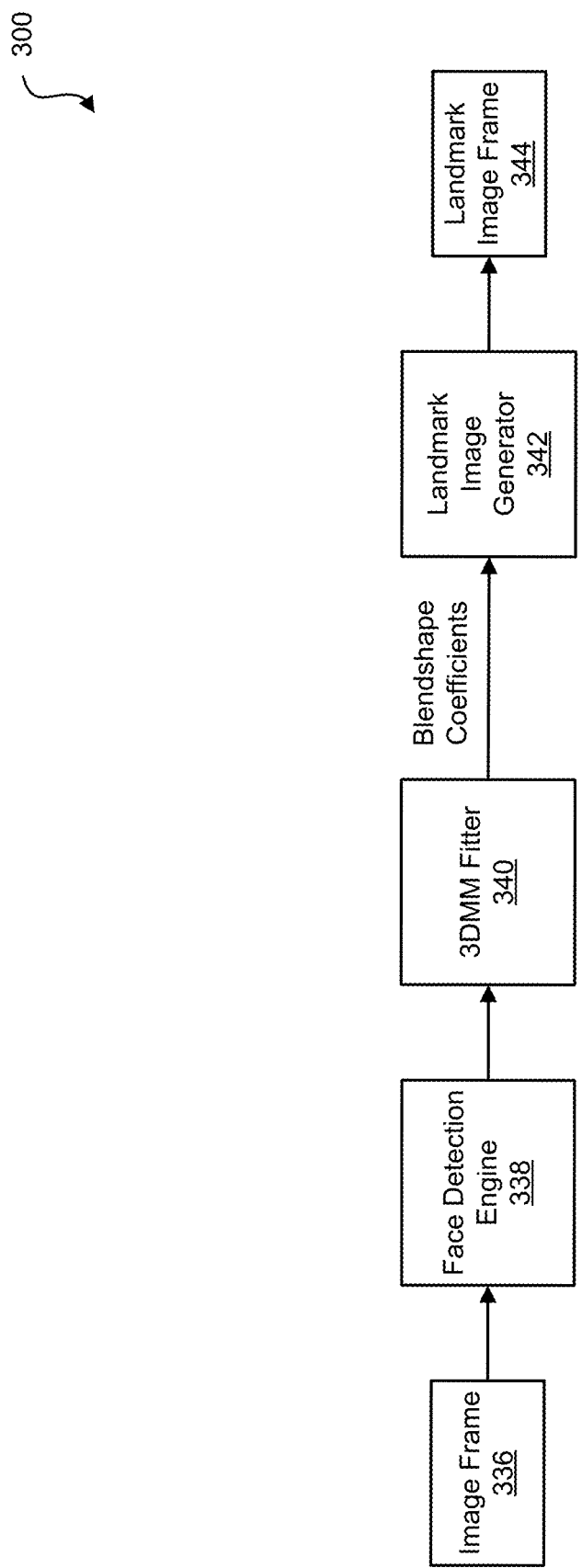
FIG. 3F is a block diagram of an example architecture of a landmark feature system, in accordance with some examples.

FIG. 3F is a block diagram of an example landmark feature system 300 configured to determine the landmark feature information 210 shown in FIG. 2. For example, the landmark feature system 300 can be configured to determine blendshape coefficients and/or landmark image frames. In one example, all or a portion of the landmark feature system 300 can correspond to and/or be implemented by the landmark feature engine 204 of the expression recognition system 200. As shown in FIG. 3E, a face detection engine 338 of the landmark feature system 300 can receive an image frame 336 (e.g., corresponding to the image frame 208 in FIG. 2). The face detection engine 338 can perform any type or form of object detection, object recognition, face detection, and/or face recognition algorithm to detect one or more faces within the image frame 336. In some examples, if the face detection engine 338 determines that the image frame 336 includes image data corresponding to a face of a person, a 3DMM fitter 340 can determine blendshape coefficients associated with the face of the person. As mentioned above, in some examples, these blendshape coefficients can correspond to the landmark feature information 210. In other examples, a landmark image generator 342 of the landmark feature system 300 can generate a landmark image frame 344 based on the blendshape coefficients determined by the 3DMM fitter 340. In some cases, the 3DMM fitter 340 can determine landmark features associated with the image frame 336 using a machine learning model (e.g., a deep neural network, such as a convolutional neural network (CNN)). For instance, the CNN can utilize a loss function that compares the image frame 366 with a 3D reconstructed version of the image frame 366. In an illustrative example, the reconstructed version of the image frame 336 can be generated based on an estimated depth map of the image frame 366. For instance, the 3DMM fitter 340 can use the estimated depth map to ensure the 3D reconstructed version of the image frame 366 is consistent with the (2D) image frame 366. The loss function (which can be referred to as a "shape from shading" loss function), can provide an accurate and/or dense set of landmark features. In some examples, the landmark image frame 344 (and optionally the blendshape coefficients) can correspond to the landmark feature information 210.

Figure 4A:
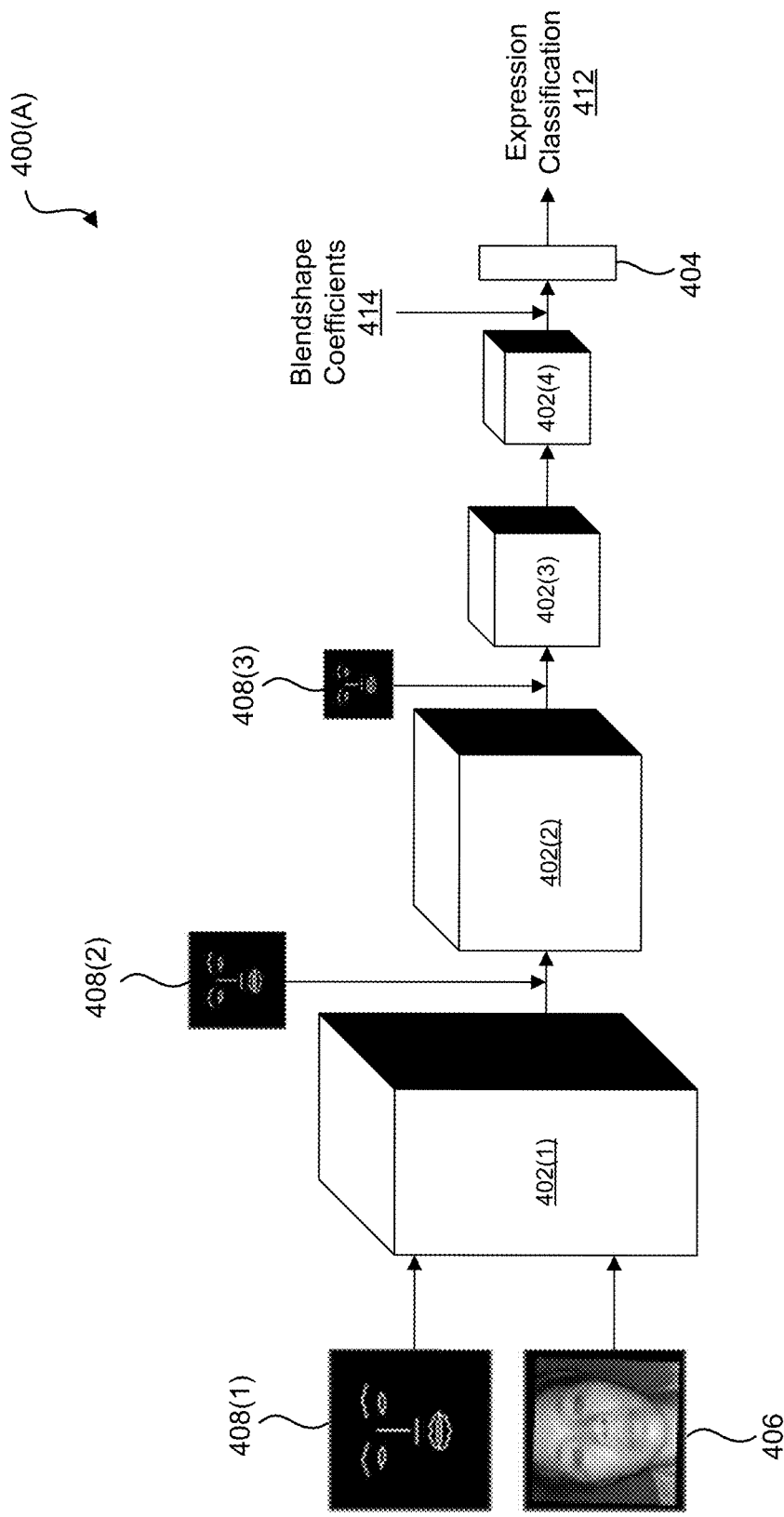
FIG. 4A, FIG. 4B, and FIG. 4C are diagrams of example architectures of neural networks trained for facial expression recognition using landmark feature information, in accordance with some examples.

FIG. 4A is a block diagram of a neural network 400(A) trained for facial expression recognition. In some examples, all or a portion of the neural network 400(A) can correspond to and/or be implemented by the expression recognition system 200 in FIG. 2. As will be explained in more detail below, the neural network 400(A) can represent an example of the overall architecture and/or framework of neural networks implemented by the disclosed facial expression recognition systems. Examples of more specific implementations of the neural networks will be provided with reference to FIG. 4B and FIG. 4C.

In some cases, the neural network 400(A) can correspond to a neural network trained on image frames associated with various facial expressions. In this example, the neural network 400(A) can be trained to output a classification of a facial expression associated with an input image frame. In an illustrative example, the neural network 400(A) can be a deep neural network, such as a convolutional neural network (CNN). Illustrative examples of deep neural networks are described below with respect to FIG. 7, FIG. 8A, FIG. 8B, FIG. 9, FIG. 10A, FIG. 10B, FIG. 10C, and FIG. 11. Additional examples of the neural network 400(A) include, without limitation, a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof.

In some cases, the neural network 400(A) can include one or more convolutional blocks, such as convolutional blocks 402(1)-402(4). As used herein, a convolutional block can represent a portion of a neural network that includes one or more convolutional layers. A convolutional layer can perform one or more functions (e.g., using one or more filters) that output activations (e.g., as activation data). In an illustrative example, a convolutional layer can implement a rectified linear activation unit (ReLU). In some examples, a convolutional block can also include one or more other types of layers. For instance, a convolutional block can include a pooling layer configured to downsample the activation data output by the convolutional layer(s). Further, in some examples, a convolutional block can include a batch normalization layer configured to normalize the mean and/or standard deviation of the activation data output by the convolutional layer(s). Additionally or alternatively, a convolutional block can include a scale layer that performs one or more scaling and/or biasing operations to restore the activation data to an appropriate range. In some cases, the batch normalization layer of a convolutional block can perform the scaling and/or biasing operations. In these cases, the convolutional block may not include a separate scale layer.

In an illustrative example, the neural network 400(A) can include four convolutional blocks that each include three convolutional layers. However, the neural network 400(A) can include any number of convolutional blocks and/or convolutional layers. The neural network 400(A) can also include one or more fully-connected layers, such as a fully-connected layer 404. In one example, the convolutional blocks 402(1)-402(4) and the fully-connected layer 404 can be trained to recognize a facial expression associated with an image frame 406 input to the neural network 400(A). For instance, the neural network 400(A) can determine an expression classification 412 (e.g., corresponding to the expression classification 212 in FIG. 2). In some cases, the expression classification 412 can correspond to and/or indicate one facial expression of a set of candidate facial expressions. Each candidate facial expression can correspond to a class of the neural network 400(A). For example, the neural network 400(A) can be trained to determine which candidate facial expression most closely matches and/or corresponds to a facial expression associated with the image frame 406. In an illustrative example, the set of candidate facial expressions can include 7 facial expressions: neutral, anger, disgust, fear, happiness, sadness, and surprise. Each candidate facial expression can be assigned a unique identifier (e.g., an integer value from 0-6). In some examples, the expression classification 412 output by the fully-connected layer 404 of the neural network 400(A) can include an identifier (e.g., an integer value) corresponding to the determined and/or selected candidate facial expression. In some examples, the fully-connected layer 404 can output a confidence or probability associated with each expression (e.g., a first probability for an identifier associated with a neutral facial expression, a second probability for an identifier associated with an angry facial expression, and so on). In such examples, the expression classification 412 can correspond to the identifier/expression having the highest confidence or probability.

In some cases, the neural network 400(A) can determine the expression classification 412 based on landmark feature information associated with the image frame 406. For example, the neural network 400(A) can receive, as input to one or more layers, blendshape coefficients and/or one or more landmark image frames associated with the image frame 406. This landmark feature information can enable the neural network 400(A) to more efficiently and/or accurately determine the expression classification 412. For example, the landmark feature information can indicate, to the neural network 400(A), features of the image frame 406 that are important and/or relevant to facial expression recognition.

In one example, one or more convolutional layers of the neural network 400(A) can utilize a landmark image frame 408(1), a landmark image frame 408(2), and/or a landmark image frame 408(3). In some cases, these landmark images can be of different sizes (e.g., resolutions or scales). For example, the size of the landmark image frame utilized by a convolutional block can correspond to the size of activation data processed by the convolutional layers of the convolutional block. Because the pooling layers of the convolutional blocks of the neural network 400(A) may downsample activation data before passing the activation data to a next layer, utilizing landmark image frames of corresponding sizes can ensure that the landmark image frames are able to be accurately processed. Additionally or alternatively, the neural network 400(A) can utilize blendshape coefficients 414. For example, the blendshape coefficients 414 can be input to the fully-connected layer 404. In some cases, the type of landmark feature information utilized by different layers of the neural network 400(A) can be based on a data format the different layers are configured to process. For example, a convolutional layer may be configured to process image data (e.g., the data format of landmark image frames), while a fully-connected layer may configured to process floating point numbers (e.g., the data format of blendshape coefficients). Further, some implementations of the neural network 400(A) can utilize landmark images (and not blendshapes coefficients), and other implementations of the neural network 400(A) can utilize blendshape coefficients (and not landmark images). However, further implementations of the neural network 400(A) can utilize both landmark images and blendshape coefficients.

Figure 4B:
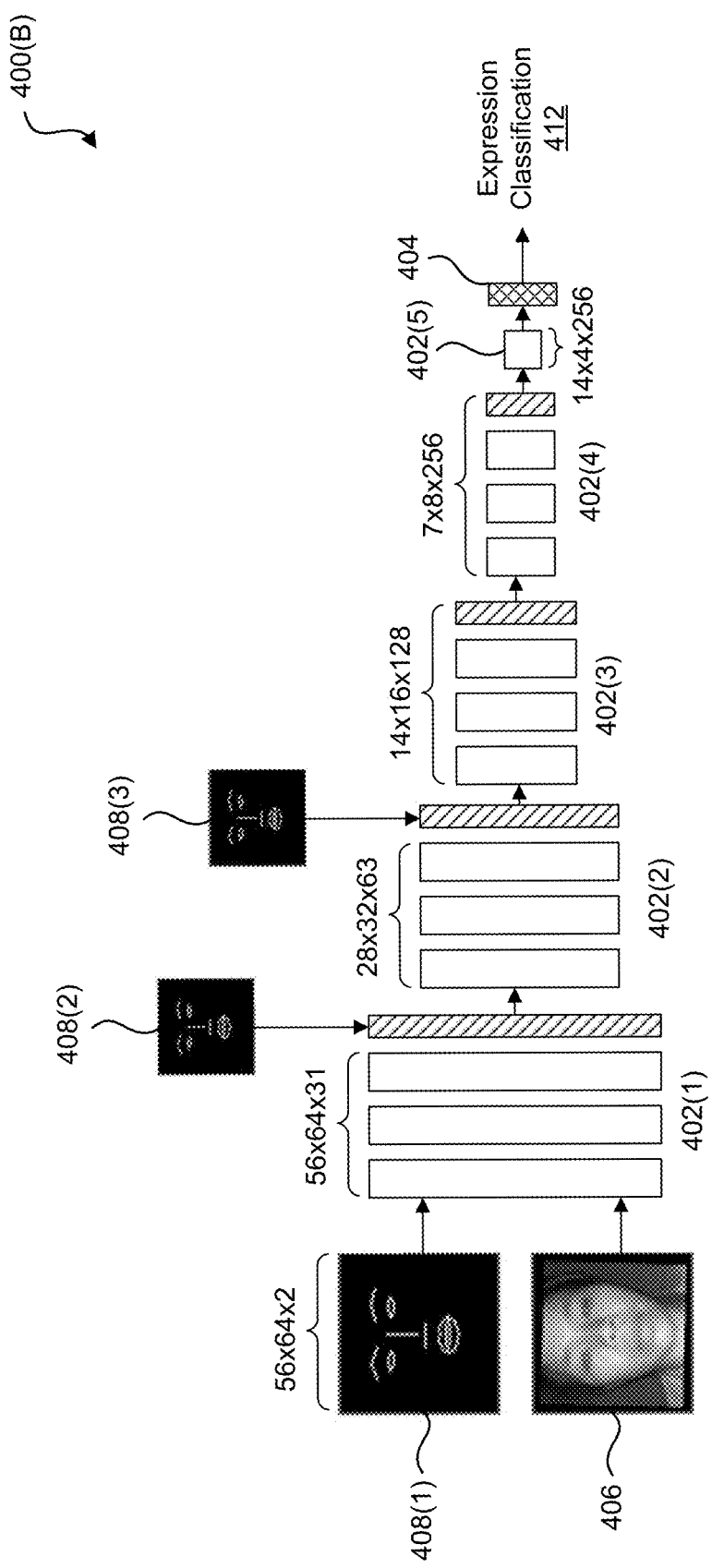

FIG. 4B is a diagram of a neural network 400(B) corresponding to an example implementation of the neural network 400(A) in FIG. 4A. The neural network 400(B) represents a "multi-scale" neural network that can utilize one or more landmark image frames of various sizes. As shown, the neural network 400(B) includes the convolutional blocks 402(1)-402(4) of the neural network 400(A) (as well as an additional convolution layer 402(5)). In this example, the convolutional blocks 402(1)-402(4) each include three convolutional layers (illustrated in FIG. 4B as non-shaded rectangles), resulting in a total of 13 convolutional layers. However, the neural network 400(B) can include any suitable number of convolutional layers. In an illustrative example, the convolutional blocks 402(1)-402(4) can perform conv2d convolution operations using a kernel size of 3. The convolutional blocks 402(1)-402(4) can also each include a pooling layer (illustrated in FIG. 4B as shaded rectangles). Further, the neural network 400(B) can include the fully-connected layer 404 of the neural network 400(A).

In one example, the convolutional block 402(1) can receive, as input, the image frame 406 and the landmark image frame 408(1). In some cases, the size of the landmark image frame 408(1) can correspond to (e.g., match) the size of the image frame 406. In an illustrative example, the size of each image frame can be 56×64 pixels. Each image frame can correspond to a separate channel, resulting in a total input size of 56×64×2. In one example, the convolutional layers of the convolutional block 402(1) can output activation data (e.g., a feature map) with a size of 56×64×31 (e.g., 31 channels of 56×64 pixels). The pooling layer of the convolutional block 402(1) can downsample (e.g., reduce the size of) this activation data before passing the activation data to the convolutional block 402(2). For instance, the pooling layer can reduce the size of activation data in each channel by half. In some cases, downsampling activation data in a convolutional neural network can enable extraction and/or analysis of various types of features (e.g., coarse features, medium-grain features, and/or fine-grained features). However, downsampling in the neural network 400(B) can result in a loss of landmark feature information passed between convolutional blocks.

To account for and/or mitigate loss of landmark feature information passed between convolutional blocks, the pooling layer of the convolutional block 402(1) can receive a landmark image frame 408(2). In one example, the landmark image frame 408(2) can be a version of the landmark image frame 408(1) that has been downsampled at a rate corresponding to the downsampling rate of the pooling layer of the convolutional block 402(1). For example, the landmark image frame 408(2) can have a size of 28×32 pixels. The pooling layer can combine the landmark image frame 408(2) with the downsampled activation data from the convolutional layers. For instance, the pooling layer can include the landmark image frame 408(2) within a separate channel, resulting in 32 channels of data with a size of 28×32 pixels. In other examples, the landmark image frame 408(2) can be the same size as the landmark image frame 408(1) (e.g., 56×64 pixels). In these examples, the pooling layer can downsample the landmark image frame 408(1) using the downsampling rate applied to the activation data input to the pooling layer. For instance, the pooling layer can reduce the size of the landmark image frame 408(2) by half, resulting in a size of 28×32 pixels. The pooling layer can then combine the downsampled landmark image frame 408(2) with the downsampled activation data from the convolutional layers (e.g., resulting in 32 channels of data with a size of 28×32 pixels). Further, in some cases, combining the landmark image frame 408(2) with the activation data can include combining a representative value (e.g., an average) of the landmark image frame 408(2) with activation data corresponding to the 31 channels. After combining the landmark image frame 408(2) with the activation data, the pooling layer can provide the combined data to the convolutional block 402(2).

In some cases, the convolutional block 402(2) can generate 63 channels of activation data with a size of 28×32 pixels. The pooling layer of the convolutional block 402(2) can downsample this activation data, resulting in 63 channels of activation data with a size of 14×16 pixels. To account for and/or mitigate loss of landmark feature information due to this down-sampling, the pooling layer can combine the downsampled activation data with a landmark image frame 408(3). In one example, the landmark image frame 408(3) can have a size corresponding to the size of each downsampled channel (e.g., 14×16 pixels). In another example, the landmark image frame 408(3) can have a size corresponding to each channel before downsampling (e.g., 28×32 pixels). In this example, the pooling layer can downsample the landmark image frame 408(3) to a size of the downsampled channels (e.g., 14×16 pixels). Thus, in either example, the total size of the data output by pooling layer of the convolutional block 402(2) can be 14×16×64. Although not illustrated in FIG. 4B, in some examples, one or more additional convolutional blocks of the neural network 400(B) can receive appropriately sized (e.g., downsampled) versions of the landmark image frame 408(1). For example, the pooling layer of the convolutional block 402(3) can receive a landmark image frame with a size of 7×8 pixels. The convolutional blocks of the neural network 400(B) can utilize any number of full-size and/or downsampled landmark image frames.

In some examples, the fully-connected layer 404 can determine the expression classification 412 based on the output of the final convolutional layer or pooling layer of the neural network 400(B) (e.g., the convolutional layer 402(5)). For instance, the fully-connected layer 404 can determine a value corresponding to each candidate facial expression (which correspond to each class of the neural network 400(B)). In an illustrative example, the fully-connected layer 404 can select the most suitable candidate facial expression using a softmax activation function that determines a probability associated with each class. The fully-connected layer 404 can output an indication (e.g., a label) associated with the class having the highest probability. The neural network 400(B) can utilize any additional or alternative function to determine the expression classification 412.

Figure 4C:
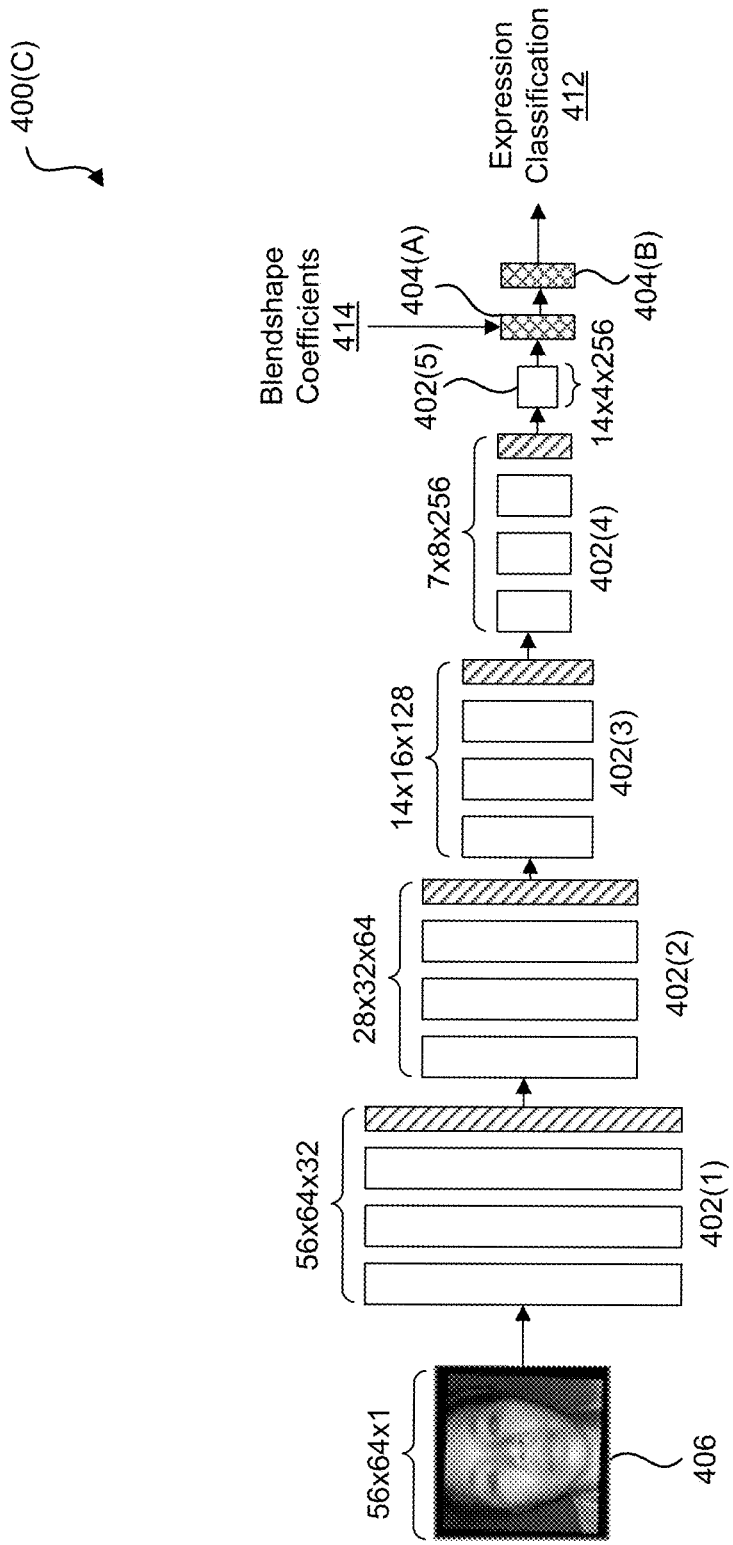

FIG. 4C is diagram of a neural network 400(C) corresponding to another example implementation of the neural network 400(A) in FIG. 4A. As shown, the architecture of the neural network 400(C) can be generally similar to the architecture of the neural network 400(B). For example, the neural network 400(C) can include the convolutional blocks 402(1)-402(4) and the convolutional layer 402(5). In an illustrative example, the convolutional blocks 402(1)-402(4) can each include three convolutional layers and a pooling layer. However, the neural network 400(C) can include any number or combination of convolutional layers and/or pooling layers. In some cases, the neural network 400(C) can receive landmark feature information at one or more fully-connected layers (instead of at one or more convolutional layers, as discussed in connection with the neural network 400(B)). For instance, instead of receiving the landmark image frames 408(1)-408(3) at the convolutional blocks 402(1)-402(3), the neural network 400(C) can receive the blendshape coefficients 414 at a fully-connected layer 404 (A). In this example, the fully-connected layer 404(A) can combine the blendshape coefficients 414 with the activation data received from the convolutional layer 402(5). For example, the fully-connected layer 404(A) can concatenate (e.g., sum) the activation data with one or more blendshape coefficients. In some cases, the fully-connected layer 404(A) (or an additional fully-connected layer 404(B)) can determine the expression classification 412 based on the concatenated data.

As discussed above, the neural network 400(B) can perform facial expression recognition using one or more landmark image frames, and the neural network 400(C) can perform facial expression recognition using blendshape coefficients. Thus, each neural network can utilize one form of landmark feature information. However, in some cases, the facial expression recognition systems described herein can utilize two (or more) types of landmark feature information (e.g., in accordance with the general neural network architecture shown in FIG. 4A). Further, in some examples, the neural networks described herein can be trained to perform facial expression recognition using a supervised training process. For example, a neural network can be trained on a set of training data including a plurality of image frames that are labeled with their associated facial expressions. Moreover, the neural networks can be trained to utilize landmark feature information based on a set of training data including a plurality of landmark image frames and/or blendshape coefficients that are labeled with their associated facial expressions. In some cases, this supervised training process can enable the neural networks to most effectively utilize landmark feature information (which may not be utilized by many traditional systems for facial expression recognition). The disclosed facial expression recognition systems can utilize neural networks trained using any additional or alternative type of training process, including unsupervised and semi-supervised training processes.

Figure 5A:
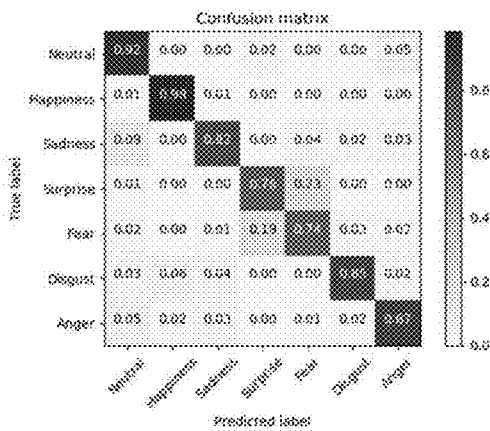
FIG. 5A and FIG. 5B are illustrations of example plots indicating the accuracy of neural networks trained for facial expression recognition using landmark feature information, in accordance with some examples.
Figure 5A:
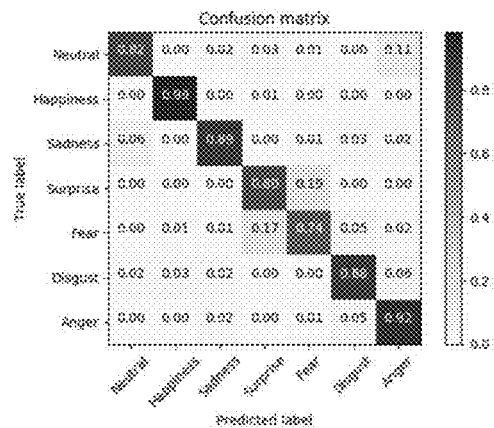
Figure 5B:
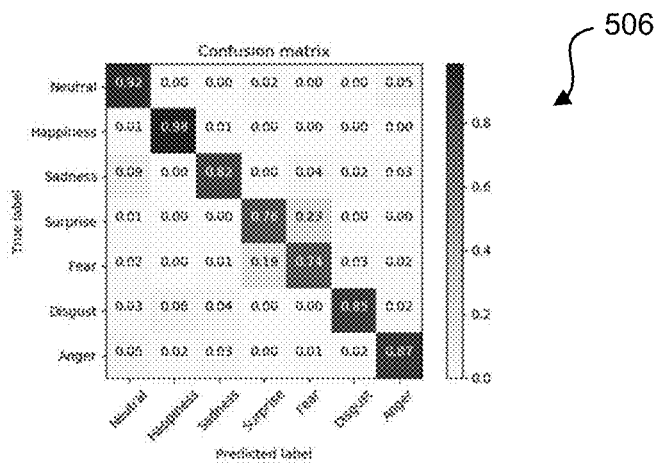
Figure 5B:
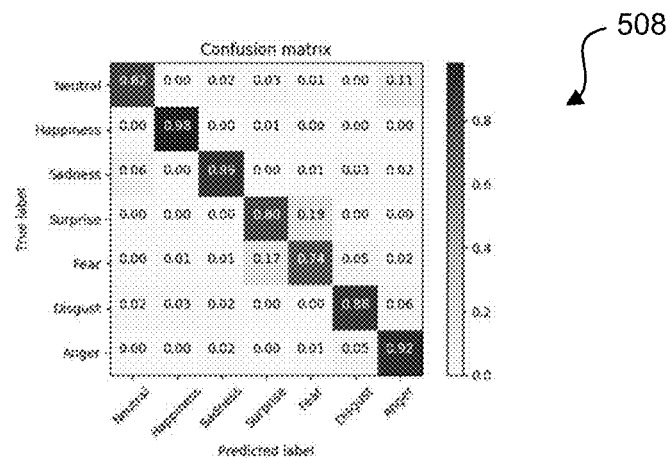
Figure 5B:
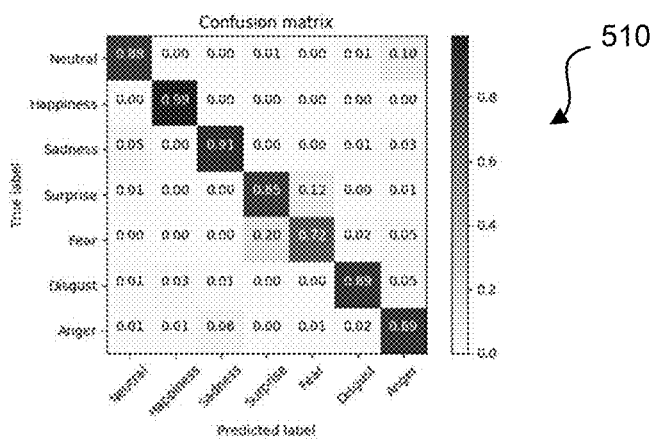

FIG. 5A and FIG. 5B illustrate example experimental data demonstrating the advantages of training neural networks to utilize landmark feature information for facial expression recognition. For example, FIG. 5A includes a plot 502 showing the accuracy of a facial expression recognition system trained using no landmark feature information. FIG. 5A also includes a plot 504 showing the accuracy of a facial expression recognition system trained using landmark image frames. Both systems utilize rotated image frames (as opposed to frontal image frames). As shown, the accuracy of the system trained using landmark images frames (e.g., 0.88) is higher than the accuracy of the system trained using no landmark feature information (e.g., 0.86). FIG. 5B includes a plot 506 showing the accuracy of a facial expression recognition system trained using no landmark feature information. FIG. 5B also includes a plot 508 showing the accuracy of a facial expression recognition system trained using blendshape coefficients. Further, FIG. 5B includes a plot 510 showing the accuracy of a facial expression recognition system trained using landmark image frames. All of the systems utilize frontal image frames (as opposed to rotated image frames). As shown, the accuracies of the systems trained using blendshape coefficients and landmark image frames (e.g., 0.88 and 0.87, respectively), are higher than the accuracy of the system trained using no landmark feature information (e.g., 0.86).

Figure 6:
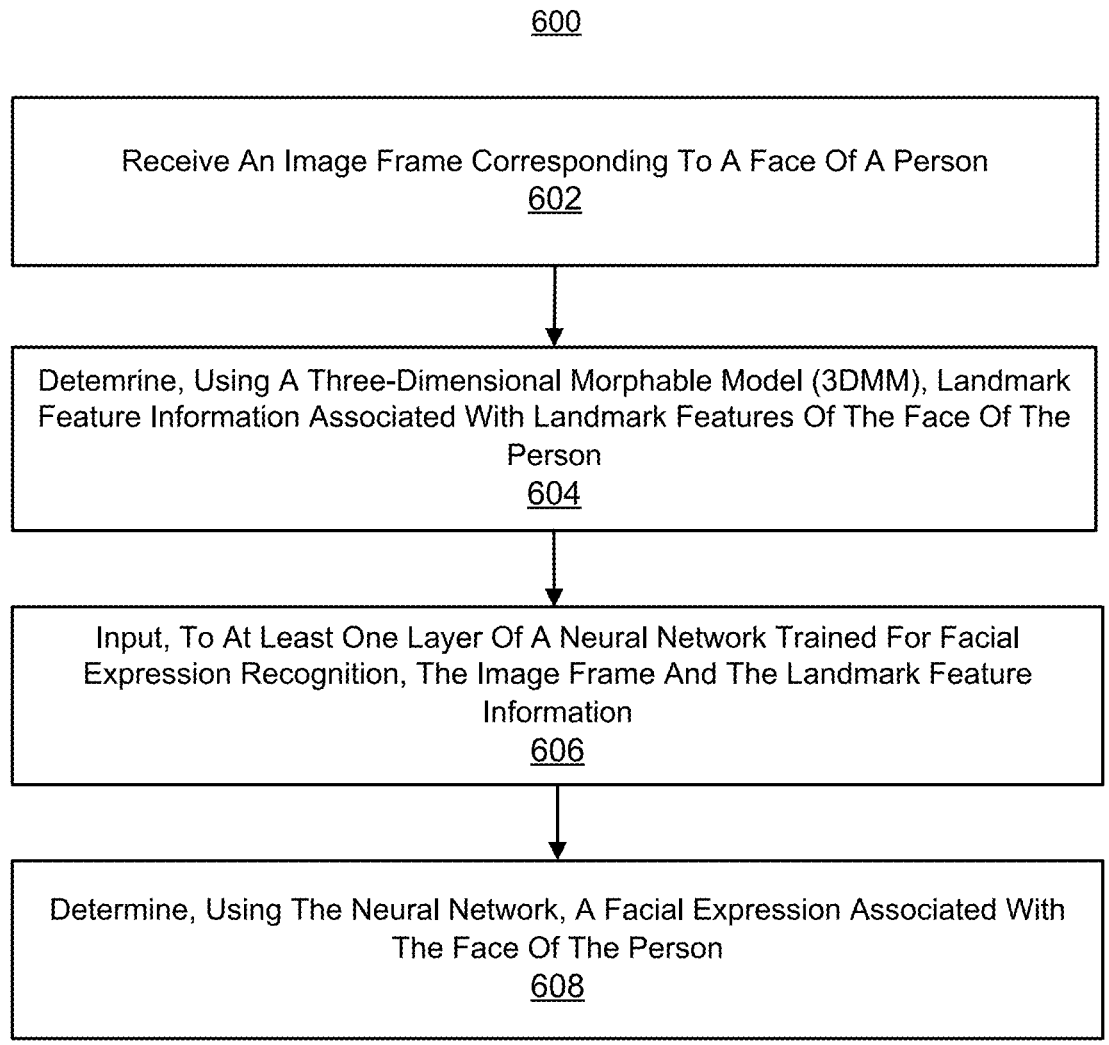
FIG. 6 is a flow diagram illustrating an example of a process improved facial expression recognition, in accordance with some examples.

FIG. 6 is flow diagram illustrating an example process 600 for improved facial expression recognition. For the sake of clarity, the process 600 is described with references to the landmark feature system 300 of FIG. 3F and the neural networks of FIG. 4A, FIG. 4B, and FIG. 4C. The steps or operations outlined herein are examples and can be implemented in any combination thereof, including combinations that exclude, add, or modify certain steps or operations.

At operation 602, the process 600 includes receiving an image frame corresponding to a face of a person. For example, the neural network 400(A) can receive the image frame 406. At operation 604, the process 600 includes determining, based on a three-dimensional model of the face, landmark feature information associated with landmark features of the face. In one example, the landmark feature information can include one or more blendshape coefficients determined based on the three-dimensional model. For example, the 3DMM fitter 340 of the landmark feature system 300 can generate the blendshape coefficients 414. In some cases, the 3DMM fitter 340 can generate the three-dimensional model (e.g., a three-dimensional morphable model (3DMM)) and then generate the blendshape coefficients 414 based on a comparison between the three-dimensional model and image data corresponding to the face within the image frame 406. Additionally or alternatively, the landmark feature information can include a landmark image frame indicating one or more landmark features of the face. For instance, the landmark image generator 342 of the landmark feature system 300 can generate the landmark image frame 408(1) using the blendshape coefficients 414. In one example, the landmark image generator 342 can determine, based on the blendshape coefficients 414, a plurality of landmark features of the face. The landmark image generator 342 can also determine a subset of the plurality of landmark features that correspond to key landmark features. For example, the key landmark features can correspond to landmark features relevant to facial expressions of people. In some cases, the landmark image generator 342 can generate the landmark image frame 408(1) based on forming one or more connections between the subset of the plurality of landmark features that correspond to the key landmark features. In an illustrative example, the landmark image frame 408(1) can be a binary image frame that indicates pixels corresponding to the key landmark features using a predetermined pixel value.

At operation 606, the process 600 includes inputting, to at least one layer of a neural network trained for facial expression recognition, the image frame and the landmark feature information. For example, the neural network 400(A) can receive the image frame 406, and receive the blendshape coefficients 414 and/or the landmark image frame 408(1). In one example, a fully-connected layer of the neural network 400(C) (e.g., an implementation of the neural network 400(A)) can receive the blendshape coefficients 414. In one example, the fully-connected layer can concatenate the blendshape coefficients 414 with data output by a convolutional layer of the neural network 400(C).

In other examples, a first layer of the neural network 400(B) (e.g., another implementation of the neural network 400(A)) can receive the landmark image frame 408(1). In this example, the landmark image frame 408(1) represents a first version of the landmark image frame associated with the image frame 406. Further, the landmark image frame 408(1) can have a first resolution (e.g., a resolution corresponding to the resolution of the image frame 406). In some cases, a second layer of the neural network 400(B) can receive the landmark image frame 408(2). The second layer can occur after the first layer. Further, the landmark image frame 408(2) can correspond to a second version of the landmark image frame having a second resolution that is lower than the first resolution.

In some cases, the first and second layers of the neural network 400(B) are convolutional layers. In some examples, the neural network 400(B) can include a pooling layer between the first layer and the second layer. The pooling layer can be configured to downsample activation data output by the first layer to the second resolution of the second version of the landmark image frame (e.g., the landmark image frame 408(2)). The pooling layer can also receive the second version of the landmark image frame and pass the downsampled activation data and the second version of the landmark image frame to the second layer of the neural network 400(B).

At operation 608, the process 600 includes determining, using the neural network, a facial expression associated with the face. For example, the neural network 400(A) can determine the expression classification 412. In one example, the expression classification 412 can represent a facial expression from a set of candidate facial expressions the neural network 400(A) is trained to identify. In some cases, using the landmark feature information (e.g., the blendshape coefficients 414 and/or one or more versions of the landmark image frame 408(1)) can enable the neural network 400(A) to more accurately and/or efficiently determine the expression classification 412.

In some examples, the process 600 can also include training the neural network 400(A) using a set of training data. The training data can include a plurality of image frames corresponding to a plurality of faces of people. In one example, the plurality of image frames can be labeled with facial expressions associated with the plurality of faces of people. In some cases, the training data can also include a plurality of landmark feature information associated with the plurality of image frames.

Figure 7:
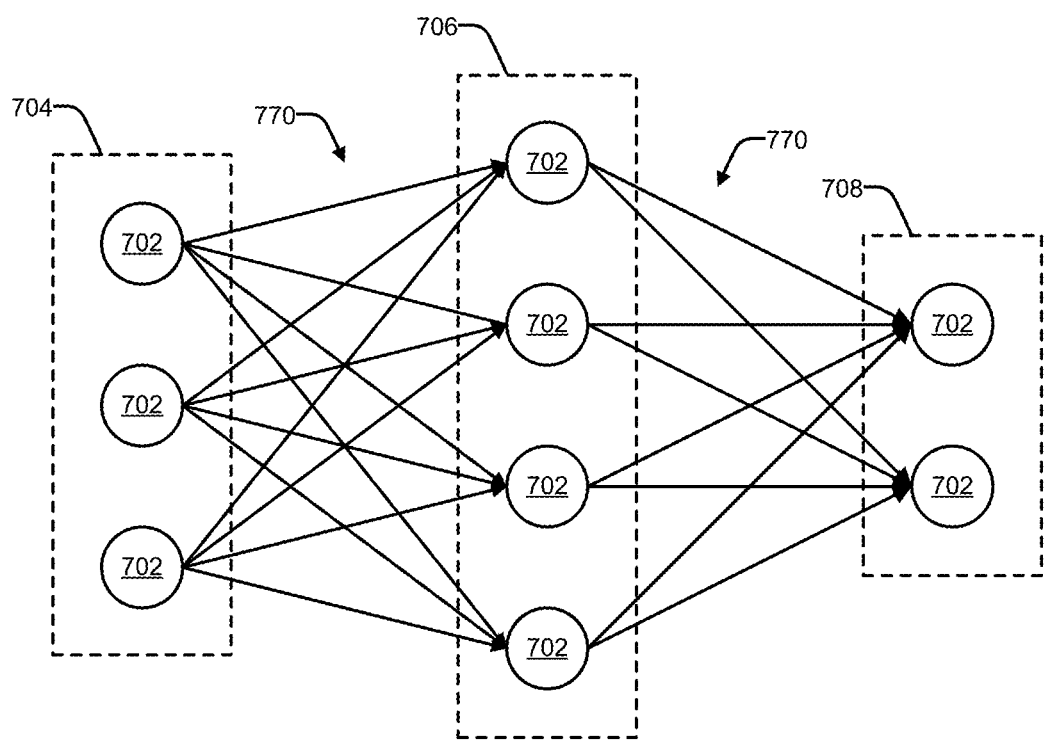
FIG. 7 is a diagram illustrating an example of a visual model for a neural network in accordance with some examples.

FIG. 7 is a diagram illustrating an example of a visual model 700 for a neural network. The model 700 can correspond to an example architecture of the neural network 400(A) in FIG. 4A, the neural network 400(B) in FIG. 4B, and/or the neural network 400(C) in FIG. 4C. In this example, the model 700 includes an input layer 704, a middle layer that is often referred to as a hidden layer 706, and an output layer 708. Each layer includes some number of nodes 702. In this example, each node 702 of the input layer 704 is connected to each node 702 of the hidden layer 706. The connections, which would be referred to as synapses in the brain model, are referred to as weights 770. The input layer 704 can receive inputs and can propagate the inputs to the hidden layer 706. Also in this example, each node 702 of the hidden layer 706 has a connection or weight 770 with each node 702 of the output layer 708. In some cases, a neural network implementation can include multiple hidden layers. Weighted sums computed by the hidden layer 706 (or multiple hidden layers) are propagated to the output layer 708, which can present final outputs for different uses (e.g., providing a classification result, detecting an object, tracking an object, and/or other suitable uses). The outputs of the different nodes 702 (weighted sums) can be referred to as activations (also referred to as activation data), in keeping with the brain model.

An example of a computation that can occur at each layer in the example visual model 700 is as follows:

$$y_j = f\left(\sum_{i=1}^{3} W_{ij} \times x_i + b\right)$$

In the above equation, Wij is a weight, xi is an input activation, yj is an output activation, f( ) is a non-linear function, and b is a bias term. Using an input image as an example, each connection between a node and a receptive field for that node can learn a weight Wij and, in some cases, an overall bias b such that each node learns to analyze its particular local receptive field in the input image. Each node of a hidden layer can have the same weights and bias (called a shared weight and a shared bias). Various non-linear functions can be used to achieve different purposes.

The model 700 can be referred to as a directed, weighted graph. In a directed graph, each connection to or from a node indicates a direction (e.g., into the node or away from the node). In a weighted graph, each connection can have a weight. Tools for developing neural networks can visualize the neural network as a directed, weighted graph, for ease of understanding and debuggability. In some cases, these tools can also be used to train the neural network and output trained weight values. Executing the neural network is then a matter of using the weights to conduct computations on input data.

A neural network that has more than three layers (e.g., more than one hidden layer) is sometimes referred to as a deep neural network. Deep neural networks can have, for example, five to more than a thousand layers. Neural networks with many layers can be capable of learning high-level tasks that have more complexity and abstraction than shallower networks. As an example, a deep neural network can be taught to recognize objects or scenes in images. In this example, pixels of an image can be fed into the input layer of the deep neural network, and the outputs of the first layer can indicate the presences of low-level features in the image, such as lines and edges. At subsequent layers, these features can be combined to measure the likely presence of higher level features: the lines can be combined into shapes, which can be further combined into sets of shapes. Given such information, the deep neural network can output a probability that the high-level features represent a particular object or scene. For example, the deep neural network can output whether an image contains a cat or does not contain a cat.

The learning phase of a neural network is referred to as training the neural network. During training, the neural network is taught to perform a task. In learning the task, values for the weights (and possibly also the bias) are determined. The underlying program for the neural network (e.g., the organization of nodes into layers, the connections between the nodes of each layer, and the computation executed by each node), does not need to change during training. Once trained, the neural network can perform the task by computing a result using the weight values (and bias values, in some cases) that were determined during training. For example, the neural network can output the probability that an image contains a particular object, the probability that an audio sequence contains a particular word, a bounding box in an image around an object, or a proposed action that should be taken. Running the program for the neural network is referred to as inference.

There are multiple ways in which weights can be trained. One method is called supervised learning. In supervised learning, all training samples are labeled, so that inputting each training sample into a neural network produces a known result. Another method is called unsupervised learning, where the training samples are not labeled. In unsupervised learning, training aims to find a structure in the data or clusters in the data. Semi-supervised learning falls between supervised and unsupervised learning. In semi-supervised learning, a subset of training data is labeled. The unlabeled data can be used to define cluster boundaries and the labeled data can be used to label the clusters.

Figure 8A:
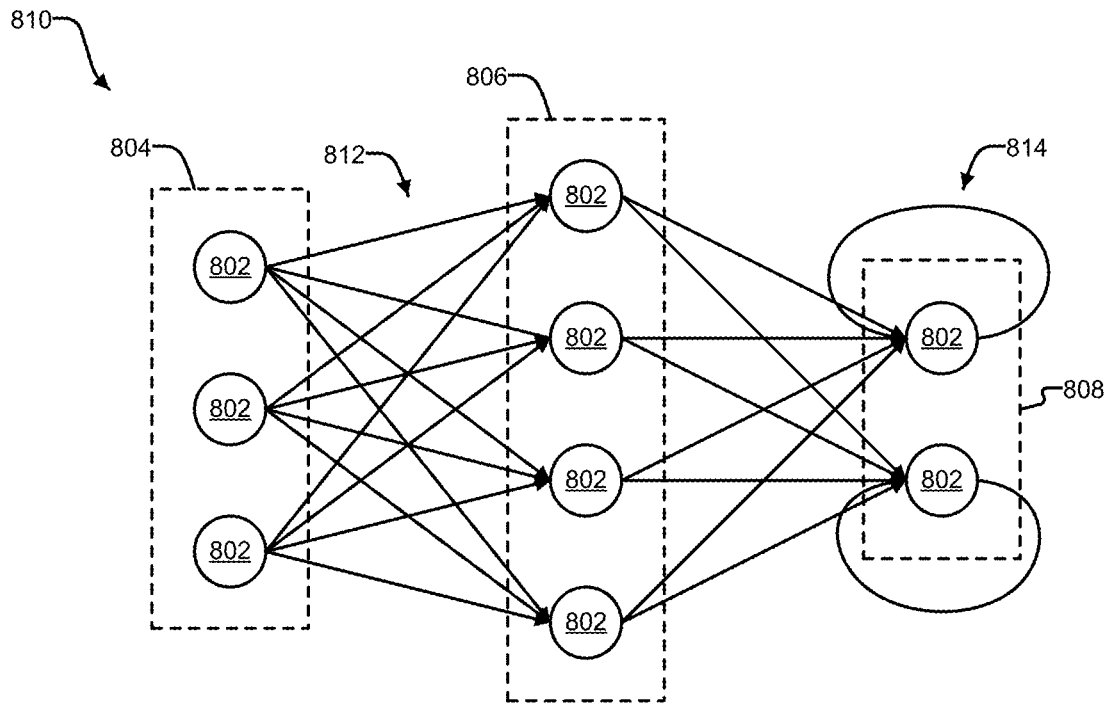
FIG. 8A is a diagram illustrating an example of a model for a neural network that includes feed-forward weights and recurrent weights, in accordance with some examples.

Different varieties of neural networks have been developed. Various examples of neural networks can be divided into two forms: feed-forward and recurrent. FIG. 8A is a diagram illustrating an example of a model 810 for a neural network that includes feed-forward weights 812 between an input layer 804 and a hidden layer 806, and recurrent weights 814 at the output layer 808. In a feed-forward neural network, the computation is a sequence of operations on the outputs of a previous layer, with the final layer generating the outputs of the neural network. In the example illustrated in FIG. 8A, feed-forward is illustrated by the hidden layer 806, whose nodes 802 operate only on the outputs of the nodes 802 in the input layer 804. A feed-forward neural network has no memory and the output for a given input can be always the same, irrespective of any previous inputs given to the neural network. The Multi-Layer Perceptron (MLP) is one type of neural network that has only feed-forward weights.

In contrast, recurrent neural networks have an internal memory that can allow dependencies to affect the output. In a recurrent neural network, some intermediate operations can generate values that are stored internally and that can be used as inputs to other operations, in conjunction with the processing of later input data. In the example of FIG. 8A, recurrence is illustrated by the output layer 808, where the outputs of the nodes 802 of the output layer 808 are connected back to the inputs of the nodes 802 of the output layer 808. These looped-back connections can be referred to as recurrent weights 814. Long Short-Term Memory (LSTM) is a frequently used recurrent neural network variant.

Figure 8B:
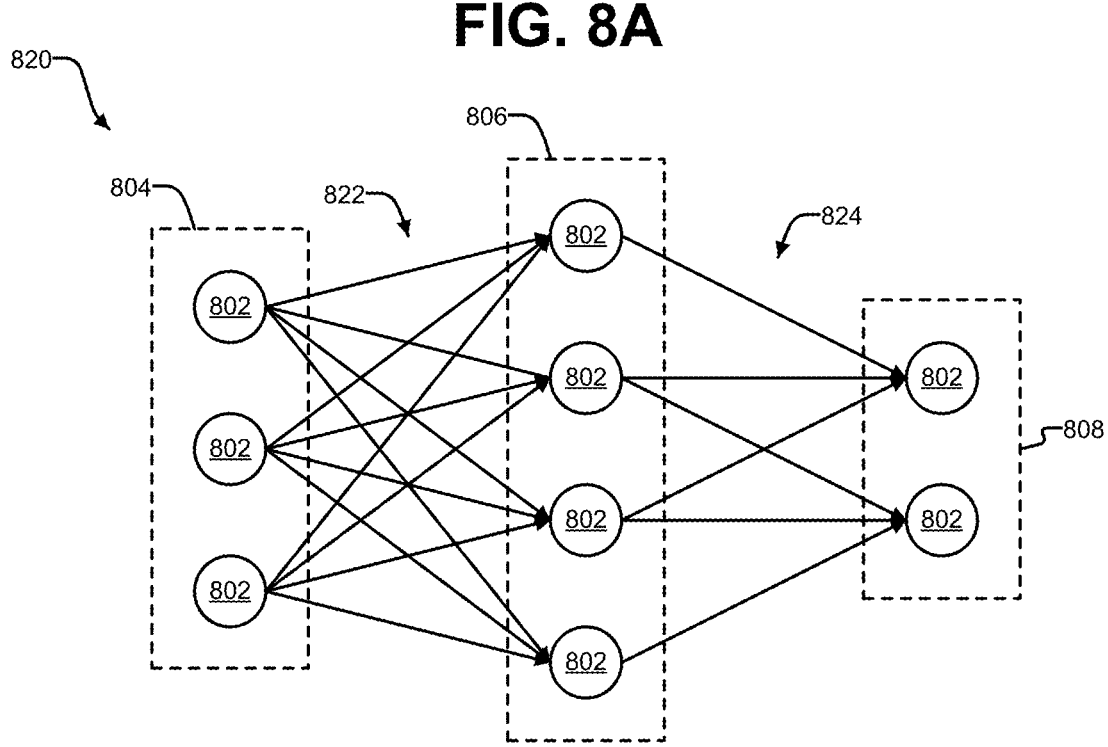
FIG. 8B is a diagram illustrates an example of a model for a neural network that includes different connection types, in accordance with some examples.

FIG. 8B is a diagram illustrating an example of a model 820 for a neural network that includes different connection types. In this example model 820, the input layer 804 and the hidden layer 806 are fully connected 822 layers. In a fully connected layer, all output activations are composed of the weighted input activations (e.g., the outputs of all the nodes 802 in the input layer 804 are connected to the inputs of all the nodes 802 of the hidden layer 806). Fully connected layers can require a significant amount of storage and computations. Multi-Layer Perceptron neural networks are one type of neural network that is fully connected.

In some applications, some connections between the activations can be removed, for example by setting the weights for these connections to zero, without affecting the accuracy of the output. The result is sparsely connected 824 layers, illustrated in FIG. 8B by the weights between the hidden layer 806 and the output layer 808. Pooling is another example of a method that can achieve sparsely connected 824 layers. In pooling, the outputs of a cluster of nodes can be combined, for example by finding a maximum value, minimum value, mean value, or median value.

A category of neural networks referred to as convolutional neural networks (CNNs) have been particularly effective for image recognition and classification (e.g., facial expression recognition and/or classification). A convolutional neural network can learn, for example, categories of images, and can output a statistical likelihood that an input image falls within one of the categories.

Figure 9:
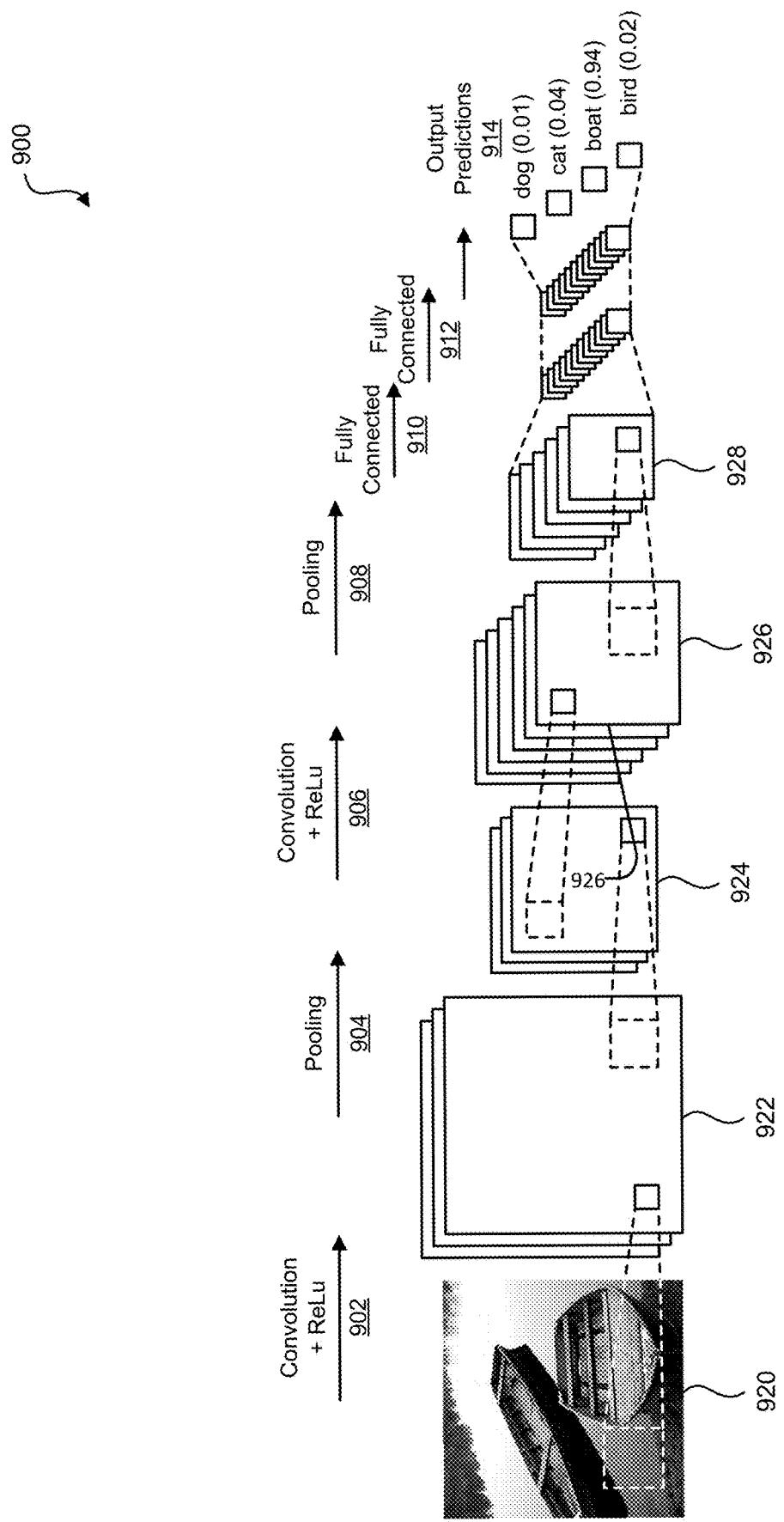
FIG. 9 is a diagram illustrating a detailed example of a model for a convolutional neural network, in accordance with some examples.

FIG. 9 is a diagram illustrating an example of a model 900 for a convolutional neural network. The model 900 illustrates operations that can be included in a convolutional neural network: convolution, activation, pooling (also referred to as sub-sampling), batch normalization, and output generation (e.g., a fully connected layer). As an example, the convolutional neural network illustrated by the model 900 is a classification network providing output predictions 914 of different classes of objects (e.g., dog, cat, boat, bird). Any given convolutional network includes at least one convolutional layer, and can have many convolutional layers. Additionally, each convolutional layer need not be followed by a pooling layer. In some examples, a pooling layer may occur after multiple convolutional layers, or may not occur at all. The example convolutional network illustrated in FIG. 9 classifies an input image 920 into one of four categories: dog, cat, boat, or bird. In the illustrated example, on receiving an image of a boat as input, the example neural network outputs the highest probability for "boat" (0.94) among the output predictions 914.

To produce the illustrated output predictions 914, the example convolutional neural network performs a first convolution with a rectified linear unit (ReLU) 902, pooling 904, a second convolution with ReLU 906, additional pooling 908, and then categorization using two fully-connected layers 910, 912. In the first convolution with ReLU 902 operation, the input image 920 is convolved to produce one or more output feature maps 922 (including activation data). The first pooling 904 operation produces additional feature maps 924, which function as input feature maps for the second convolution and ReLU 906 operation. The second convolution with ReLU 906 operation produces a second set of output feature maps 926 with activation data. The additional pooling 908 step also produces feature maps 928, which are input into a first fully-connected layer 910. The output of the first fully-connected layer 910 is input into a second fully-connect layer 912. The outputs of the second fully-connected layer 912 are the output predictions 914. In convolutional neural networks, the terms "higher layer" and "higher-level layer" refer to layers further away from the input image (e.g., in the example model 900, the second fully-connected 912 layer is the highest layer).

The example of FIG. 9 is one example of a convolutional neural network. Other examples can include additional or fewer convolution operations, ReLU operations, pooling operations, and/or fully-connected layers. Convolution, non-linearity (ReLU), pooling or sub-sampling, and categorization operations will be explained in greater detail below.

When conducting an image processing function (e.g., image recognition, object detection, object classification, object tracking, or other suitable function), a convolutional neural network can operate on a numerical or digital representation of the image. An image can be represented in a computer as a matrix of pixel values. For example, a video frame captured at 1080$p$ includes an array of pixels that is 1920 pixels across and 1080 pixels high. Certain components of an image can be referred to as a channel. For example, a color image has three color channels: red (R), green (G), and blue (B) or luma (Y), chroma red (Cr), and chroma blue (Cb). In this example, a color image can be represented as three two-dimensional matrices, one for each color, with the horizontal and vertical axis indicating a location of a pixel in the image and a value between 0 and 255 indicating a color intensity for the pixel. As another example, a greyscale image has only one channel, and thus can be represented as a single two-dimensional matrix of pixel values. In this example, the pixel values can also be between 0 and 255, with 0 indicating black and 255 indicating white, for example. The upper value of 255, in these examples, assumes that the pixels are represented by 8-bit values. In other examples, the pixels can be represented using more bits (e.g., 16, 32, or more bits), and thus can have higher upper values.

As shown in FIG. 9, a convolutional network is a sequence of layers. Every layer of a convolutional neural network transforms one volume of activation data (also referred to as activations) to another volume of activation through a differentiable function. For example, each layer can accepts an input 3D volume and can transforms that input 3D volume to an output 3D volume through a differentiable function. Three types of layers that can be used to build convolutional neural network architectures can include convolutional layers, pooling layers, and one or more fully-connected layer. A network also includes an input layer, which can hold raw pixel values of an image. For example, an example image can have a width of 32 pixels, a height of 32 pixels, and three color channels (e.g., R, G, and B color channnles). Each node of the convolutional layer is connected to a region of nodes (pixels) of the input image. The region is called a receptive field. In some cases, a convolutional layer can compute the output of nodes (also referred to as neurons) that are connected to local regions in the input, each node computing a dot product between its weights and a small region they are connected to in the input volume. Such a computation can result in volume [32×32×12] if 12 filters are used. The ReLu layer can apply an elementwise activation function, such as the max(0,x) thresholding at zero, which leaves the size of the volume unchanged at [32×32×12]. The pooling layer can perform a downsampling operation along the spatial dimensions (width, height), resulting in reduced volume of data, such as a volume of data with a size of [16×16×12]. The fully-connected layer can compute the class scores, resulting in volume of size [1×1× 4], where each of the four (4) numbers correspond to a class score, such as among the four categories of dog, cat, boat, and bird. The CIFAR-10 network is an example of such a network, and has ten categories of objects. Using such a neural network, an original image can be transformed layer by layer from the original pixel values to the final class scores. Some layers contain parameters and others may not. For example, the convolutional and fully-connected layers perform transformations that are a function of the activations in the input volume and also of the parameters (the weights and biases) of the nodes, while the ReLu and pooling layers can implement a fixed function.

A convolution is a mathematical operation that can be used to extract features from an input image. Features that can be extracted include, for example, edges, curves, corners, blobs, and ridges, among others. Convolution preserves the spatial relationship between pixels by learning image features using small squares of input data.

Figure 10C:
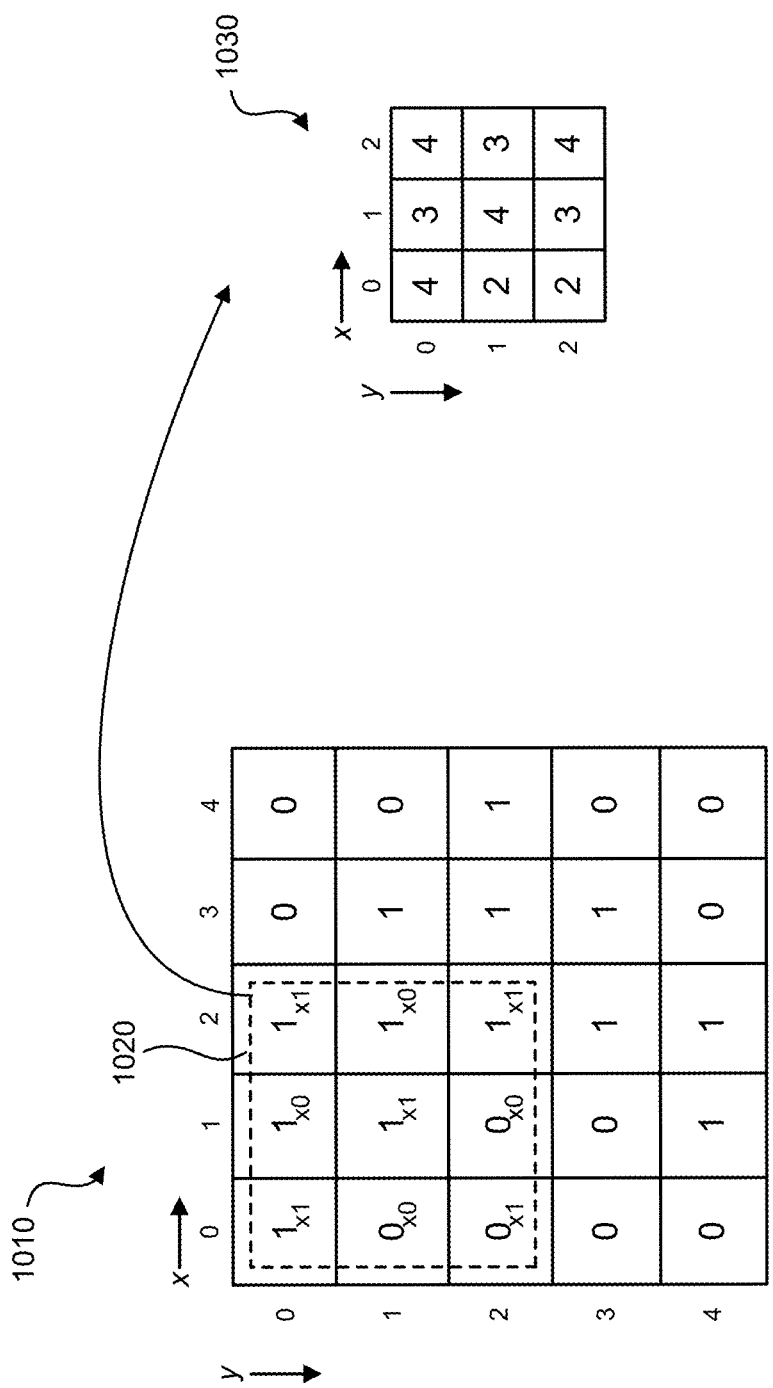

FIG. 10A, FIG. 10B, and FIG. 10C are diagrams illustrating a simple example of a convolutional operation. FIG. 10A illustrates an example input matrix 1010 of pixel values. In this example, the input image represented by the input matrix 1010 is five pixels wide by five pixels high. For purposes of this example, the pixel value are only 0 and 1. In other examples, the pixel values can range from 0 to 255, as discussed above. Because there is only one input matrix 1010, the image has only one channel, and can be assumed to be a greyscale image.

FIG. 10B illustrates an example of a filter 1020, which can also be referred to as a kernel or a feature detector. The filter 1020 can be used to extract different features from the image, such as edges, curves, corners, and so on, by changing the numerical values in the matrix of the filter 1020. In this simplified example, the matrix values are 0 or 1. In other examples, the matrix values can be greater than one, can be negative, and/or can be fractional.

FIG. 10C illustrates convolution of the input matrix 1010 with the filter 1020. The convolutional operation involves computing a value for each possible position of the filter 1020 over the input matrix 1010 by multiplying the input matrix 1010 values and the filter 1020 values and summing the resulting products. In one example, as shown in FIG. 10C, the filter 1020 overlaps (x, y) positions (0, 0), (1,0), (2, 0), (0, 1), (1, 1), (2, 1), (0, 2), (1, 2), and (2, 2) of the input matrix 1010, which is called a receptive field of the filter. For instance, the value of the input matrix 1010 at position (0, 0) is multiplied by the value of the filter 1020 at position (0, 0) to produce a product of 1 (based on the product of 1×1). For each receptive field for the filter 1020 in the input matrix, the multiplication is repeated for each position in the filter 1020 that overlaps with a position in the input matrix 1010. The products are then summed to produce a value of 4 for the illustrated filter position.

The value of 4 is placed at a position (0, 0) in a feature map 1030, which can also be referred to as a convolved feature or an activation map, that includes activation data. The (0, 0) position corresponds to the filter's position, as illustrated in FIG. 10C. To obtain a value for position (1, 0) in the feature map 1030, the filter 1020 is slid to the right by one pixel (referred to as a stride of one), and the multiply-add operation is repeated. To obtain a value for position (0, 1) in the feature map 1030, the filter 1020 can be moved to overlap positions (0, 1) through (2, 3) in the input matrix 1010. Similar operations can be performed to obtain the values for the remaining positions in the feature map 1030.

In examples that include more channels, the filter 1020 can be applied to the input matrix 1010 for each channel. For example, a color image can have three channels, and thus three input matrices. In this example, convolution of the three input matrices can thus result in three feature maps for each receptive field in the input matrix 1010.

In practice, the filter values, which can also be referred to as weights, are determined during training of the neural network. Design of a convolutional neural network thus involves specifying factors such as the number of filters to use, the filter size, and the architecture of the network, including the number of layers and the operation executed in each layer.

The size of the feature maps can be controlled by three parameters: depth, stride, and zero-padding. Depth corresponds to the number of filters used in a convolutional operation. Applying more filters can result in more features being extracted, and the neural network possibly being able to produce a more accurate identification. Each additional filter, however, increases the number of computations that need to be performed. Additionally, each filter results in a separate feature map, which requires additional storage space. A set of feature maps extracted in the same convolutional network can be thought of as a stack of two-dimensional matrices, sometimes collectively referred to as a single feature map, in which case the depth of the feature map is the number of the two-dimensional matrices.

The stride is the number of samples (e.g., pixels) by which a filter matrix is moved across an input matrix. In the example of FIG. 10C, the filter 1020 matrix is moved by one pixel at a time, thus the stride is equal to one. As one illustrative example, when the stride of a filter is a value of two, the filter moves two pixels between convolutional computations. A larger stride results in a smaller feature map.

In the example of FIG. 10C, some information at the edges of the input matrix 1010 may not be well captured. This is because, in this example, the filter is applied to some positions once (e.g., position (0, 0)) or twice (e.g., position (0, 1)), while the filter is applied four times to all other positions. In some cases, loss of edge information is acceptable. When it is not desirable to lose edge information, zero-padding may be applied, meaning that the input matrix is increased in size in all directions by the same amount of pixels and the new positions are given a value of zero. Zero-padding can also be used to control the size of the feature maps. Addition of zero-padding can be referred to as wide convolution, while not using zero-padding can be referred to as narrow convolution.

In some cases, an operation referred to as ReLU is applied to a feature map. ReLU, which stands for Rectified Linear Unit, is one type of activation layer. ReLU is a non-linear operation, whose output can be given by:

Output=Max(0,Input)

ReLU is an element-wise operation applied to each pixel. ReLU replaces all negative pixel values in a feature map by zero. Convolution is a linear operation including element-wise matrix multiplication and addition. ReLU introduces non-linearity into a convolutional neural network on the assumption that most of the real-world data the convolutional neural network is to learn about is non-linear. Other non-linear functions can be used, such as tanh or sigmoid.

A convolutional neural network can also include pooling, which can also be referred to as sub-sampling or down sampling. Pooling reduces the dimensionality of a feature map while retaining the most important information. Various pooling functions can be used, such as max, average, sum, and others.

Figure 11:
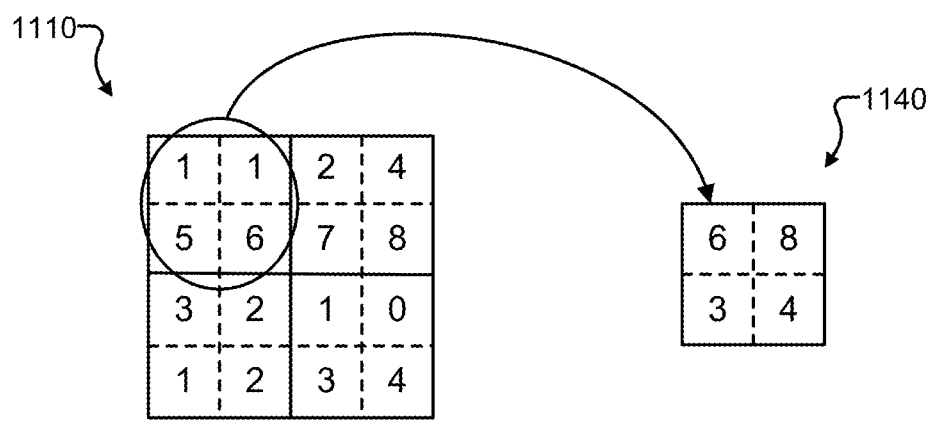
FIG. 11 is a diagram illustrating an example of max pooling applied to a rectified feature map, in accordance with some examples.

FIG. 11 is a diagram illustrating an example of max pooling applied to a rectified feature map 1110; that is, a feature map to which ReLU or another non-linear function has been applied. In the example of FIG. 11, a spatial neighborhood of two pixels wide by two pixels high has been defined. Within the 2×2 window, the maximum value is taken and placed in the pooled feature map 1140. Also in this example, the window is moved by two pixels (also referred to as a stride of two) for each max operation, resulting in the 4×4 rectified feature map 1110 being reduced to a 2×2 pooled feature map 1140. In other examples, an average of the values in the window can be computed for the pooled feature map 1140, or a sum, or some other computation. Max pooling is most commonly used.

When a pooling operation is applied, the operation is applied separately to each feature map output from a convolutional layer (or a convolution and ReLU layer). The number of pooled feature maps from a pooling layer is thus the same as the number of feature maps that are input into the pooled layer.

A convolutional neural network can include pooling to progressively reduce the spatial size of the input representation. For example, pooling can make the input representations (e.g., the feature dimension) smaller and more manageable. As another example, pooling can reduce the number of parameters and computations that need to be performed by the neural network. As another example, pooling can make the neural network invariant to small transformations, distortions, or translations in the input image. That is, a small distortion in the input is not likely to change the output of the pooling, since the maximum (or average, or sum, or some other operation) is taken in a local neighborhood. As a further example, pooling can assist in determining an almost scale invariant representation of the image (referred to as an equivariant representation). This means that an object can be detected in an image no matter where the object is located within the image.

As illustrated by the example of FIG. 9, a convolutional neural network can include multiple convolutional layers, with each layer refining the features extracted by a previous layer. Each convolutional layer may be, but need not be, followed by pooling. The output of a combination of these layers represent high-level features of the input image, such as the presence of certain shapes, colors, textures, gradients, and so on.

To turn these feature maps into a classification, a convolutional neural network can include one or more fully-connected layers. In some cases, a Multi-Layer Perceptron that uses, for example, a softmax activation function can be used after a fully-connected layer. A fully-connected layer can classify the input image into various classes based on training data. For example, the convolutional neural network of FIG. 9 was trained to recognize dogs, cats, boats, and birds, and can classify objects in an input image as including one of these classes.

Apart from classification, a fully-connected layer in a convolutional neural network might also provide an inexpensive (in computational and/or data storage terms) way to learn non-linear combinations of the extracted features. The features extracted by the convolution and pooling layers may be good for making a classification, but a combination of the features may be better.

In the example of FIG. 9, the sum of the output predictions 914 is 1, due to the output layer using a softmax activation function. The softmax function takes a vector of arbitrary real-valued scores and compresses these values into a vector of values between zero and one that add up to one.

As noted above, the filter values are determined during training of the convolutional neural network. Training can be accomplished, for example, using a backpropagation technique. This technique involves, first, initializing all filter values and any related parameters with random values. Second, a training image can be input into the neural network. In this step, because the weights were randomly assigned, the output probabilities likely will also be random. For example, the output vector for the neural network of FIG. 9 might be [0.2, 0.4, 0.1, 0.3], representing the probability that the training image is a dog, cat, boat, or bird, respectively.

Next, a total error at the output layer can be calculated, as follows:

$$\text{Total Error} = \sum \frac{(\text{target probablity} - \text{output probablity})^2}{2}$$

In the above equation, the target probability is a vector representing the desired outcome. For example, for the input image 920 illustrated in FIG. 9, the target probabilities is [0, 0, 1, 0].

The fourth step is to use backpropagation to calculate gradients of error with respect to all weights in the neural network. Further, gradient descent can be used to update all filter values or weights and parameter values, to minimize the output error. For example, a weight can be adjusted in proportion to the weight's contribution to the total error. When the same training image is input again, the output vector might be closer to the target probabilities. Back propagation can be repeated until the output vector is within a desired range of the target probability. The training steps can further be repeated for each image in a training data set.

In the training processes, parameters such as the number of filters, the filter sizes, and the organization of the layers remain unchanged. During training, only the values of the filter matrices and connection weights are changed.

Research has found that the more convolution steps a neural network has, the more features the network will be able to learn to recognize. For example, in an image classification example, in a first layer, the neural network may learn to detect edges from the raw pixels, then in a second layer use the edges to detect shapes, and in a third layer, the neural network may be able to use the shapes to determine higher-level features, such as facial shapes, in higher layers.

Figure 12:
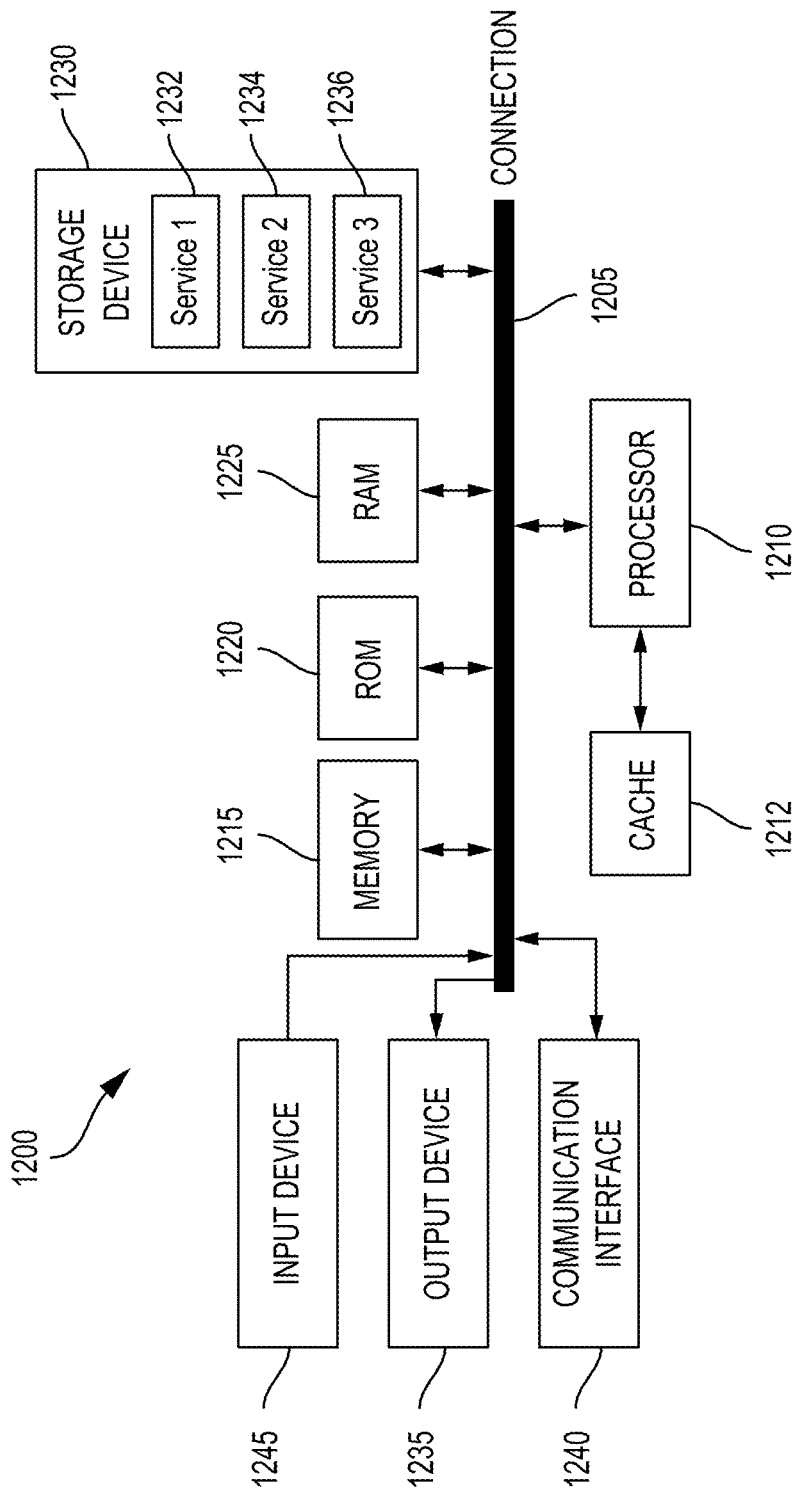
FIG. 12 is a diagram illustrating an example of a system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processyu76ytor may also be implemented as a combination of computing devices, e.g., a combination of a DSP and a microprocessor, a plurality of microprocessors, one or more microprocessors in conjunction with a DSP core, or any other such configuration.

Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for facial expression recognition, the apparatus comprising: a memory; and one or more processors coupled to the memory, the one or more processors being configured to: receive an image frame corresponding to a face of a person; determine, based on a three-dimensional model of the face, landmark feature information associated with landmark features of the face; input, to at least one layer of a neural network trained for facial expression recognition, the image frame and the landmark feature information; and determine, using the neural network, a facial expression associated with the face.

Aspect 2. The apparatus of aspect 1, wherein the landmark feature information includes one or more blendshape coefficients determined based on the three-dimensional model.

Aspect 3. The apparatus of aspect 2, wherein the one or more processors are configured to: generate the three-dimensional model of the face; and determine the one or more blendshape coefficients based on a comparison between the three-dimensional model of the face and image data corresponding to the face within the image frame.

Aspect 4. The apparatus of any one of aspects 2 or 3, wherein the one or more processors are configured to input the one or more blendshape coefficients to a fully-connected layer of the neural network.

Aspect 5. The apparatus of aspect 4, wherein the fully connected layer concatenates the one or more blendshape coefficients with data output by a convolutional layer of the neural network.

Aspect 6. The apparatus of any one of aspects 2 to 5, wherein the one or more processors are configured to generate, using the one or more blendshape coefficients, a landmark image frame indicating one or more landmark features of the face.

Aspect 7. The apparatus of aspect 6, wherein the one more processors are configured to: determine, based on the one or more blendshape coefficients, a plurality of landmark features of the face; determine a subset of the plurality of landmark features that correspond to key landmark features; and generate the landmark image frame based on forming one or more connections between the subset of the plurality of landmark features that correspond to the key landmark features.

Aspect 8. The apparatus of aspect 7, wherein the one or more processors are configured to determine the subset of the plurality of landmark features that correspond to the key landmark features based on determining landmark features relevant to facial expressions of people.

Aspect 9. The apparatus of any one of aspects 7 to 8, wherein the landmark image frame includes a binary image frame that indicates pixels corresponding to the key landmark features using a predetermined pixel value.

Aspect 10. The apparatus of any one of aspects 6 to 9, wherein the one or more processors are configured to input the landmark image frame to one or more layers of the neural network.

Aspect 11. The apparatus of aspect 10, wherein the one or more processors are configured to: input a first version of the landmark image frame to a first layer of the neural network, the first version of the landmark image frame having a first resolution; and input a second version of the landmark image frame to a second layer of the neural network occurring after the first layer, the second version of the landmark images frame having a second resolution that is lower than the first resolution.

Aspect 12. The apparatus of aspect 11, wherein the first and second layers of the neural network are convolutional layers.

Aspect 13. The apparatus of any one of aspects 11 or 12, wherein the neural network includes a pooling layer between the first layer and the second layer, the pooling layer configured to: downsample activation data output by the first layer to the second resolution of the second version of the landmark image frame; receive the second version of the landmark image frame; and pass the downsampled activation data output by the first layer and the second version of the landmark image frame to the second layer.

Aspect 14. The apparatus of any one of aspects 1 to 13, wherein the one or more processors are configured to train the neural network using a set of training data including: a plurality of image frames corresponding to a plurality of faces of people, the plurality of image frames being labeled with facial expressions associated with the plurality of faces of people; and a plurality of landmark feature information associated with the plurality of image frames.

Aspect 15. The apparatus of any one of aspects 1 to 14, wherein the three-dimensional model includes a three-dimensional morphable model (3DMM).

Aspect 16. The apparatus of any one of aspects 1 to 15, wherein the apparatus includes a camera system that captures the image frame corresponding to the face of the person.

Aspect 17. The apparatus of any one of aspects 1 to 16, wherein the apparatus includes a mobile device.

Aspect 18. The apparatus of any one of aspects 1 to 17, further comprising a display.

Aspect 19. A method of facial expression recognition, the method comprising: receiving an image frame corresponding to a face of a person; determining, based on a three-dimensional model of the face, landmark feature information associated with landmark features of the face; inputting, to at least one layer of a neural network trained for facial expression recognition, the image frame and the landmark feature information; and determining, using the neural network, a facial expression associated with the face.

Aspect 20. The method of aspect 19, wherein the landmark feature information includes one or more blendshape coefficients determined based on the three-dimensional model.

Aspect 21. The method of aspect 20, further comprising: generating the three-dimensional model of the face; and determining the one or more blendshape coefficients based on a comparison between the three-dimensional model of the face and image data corresponding to the face within the image frame.

Aspect 22. The method of any one of aspects 20 or 21, further comprising inputting the one or more blendshape coefficients to a fully-connected layer of the neural network.

Aspect 23. The method of aspect 22, wherein the fully connected layer concatenates the one or more blendshape coefficients with data output by a convolutional layer of the neural network.

Aspect 24. The method of any one of aspects 20 to 23, further comprising generating, using the one or more blendshape coefficients, a landmark image frame indicating one or more landmark features of the face.

Aspect 25. The method of aspect 24, further comprising: determining, based on the one or more blendshape coefficients, a plurality of landmark features of the face; determining a subset of the plurality of landmark features that correspond to key landmark features; and generating the landmark image frame based on forming one or more connections between the subset of the plurality of landmark features that correspond to the key landmark features.

Aspect 26. The method of aspect 25, further comprising determining the subset of the plurality of landmark features that correspond to the key landmark features based on determining landmark features relevant to facial expressions of people.

Aspect 27. The method of any one of aspects 25 or 26, wherein the landmark image frame includes a binary image frame that indicates pixels corresponding to the key landmark features using a predetermined pixel value.

Aspect 28. The method of any one of aspects 24 to 27, further comprising inputting the landmark image frame to one or more layers of the neural network.

Aspect 29. The method of aspect 28, further comprising: inputting a first version of the landmark image frame to a first layer of the neural network, the first version of the landmark image frame having a first resolution; and inputting a second version of the landmark image frame to a second layer of the neural network occurring after the first layer, the second version of the landmark images frame having a second resolution that is lower than the first resolution.

Aspect 30. The method of aspect 29, wherein the first and second layers of the neural network are convolutional layers.

Aspect 31. The method of any one of aspects 29 or 30, wherein the neural network includes a pooling layer between the first layer and the second layer, the pooling layer configured to: downsample activation data output by the first layer to the second resolution of the second version of the landmark image frame; receive the second version of the landmark image frame; and pass the downsampled activation data output by the first layer and the second version of the landmark image frame to the second layer.

Aspect 32. The method of any one of aspects 19 to 31, further comprising training the neural network using a set of training data including: a plurality of image frames corresponding to a plurality of faces of people, the plurality of image frames being labeled with facial expressions associated with the plurality of faces of people; and a plurality of landmark feature information associated with the plurality of image frames.

Aspect 33. The method of any one of aspects 19 to 32, wherein the three-dimensional model includes a three-dimensional morphable model (3DMM).

Aspect 34. A computer-readable storage medium storing instructions that, when executed by one or more processors, cause the one or more processors to perform any of the operations of Aspects 1 to 33.

Aspect 35. An apparatus comprising means for performing any of the operations of Aspects 1 to 33.

What is claimed is:

1. An apparatus for facial expression recognition, the apparatus comprising:
   a memory; and
   one or more processors coupled to the memory, the one or more processors being configured to:
   receive an image frame corresponding to a face of a person;

determine, based on a three-dimensional model of the face, landmark feature information associated with landmark features of the face, wherein the landmark feature information includes one or more blendshape coefficients determined based on the three-dimensional model;

input, to at least one layer of a neural network trained for facial expression recognition, the image frame and the landmark feature information;

determine, using the neural network, a facial expression associated with the face;

generate the three-dimensional model of the face; and determine the one or more blendshape coefficients based on a comparison between the three-dimensional model of the face and image data corresponding to the face within the image frame.

2. The apparatus of claim 1, wherein the one or more processors are configured to input the one or more blendshape coefficients to a fully-connected layer of the neural network.

3. The apparatus of claim 2, wherein the fully connected layer concatenates the one or more blendshape coefficients with data output by a convolutional layer of the neural network.

4. The apparatus of claim 1, wherein the one or more processors are configured to generate, using the one or more blendshape coefficients, a landmark image frame indicating one or more landmark features of the face.

5. The apparatus of claim 4, wherein the one more processors are configured to:

determine, based on the one or more blendshape coefficients, a plurality of landmark features of the face;

determine a subset of the plurality of landmark features that correspond to key landmark features; and generate the landmark image frame based on forming one or more connections between the subset of the plurality of landmark features that correspond to the key landmark features.

6. The apparatus of claim 5, wherein the one or more processors are configured to determine the subset of the plurality of landmark features that correspond to the key landmark features based on determining landmark features relevant to facial expressions of people.

7. The apparatus of claim 6, wherein the landmark image frame includes a binary image frame that indicates pixels corresponding to the key landmark features using a predetermined pixel value.

8. The apparatus of claim 4, wherein the one or more processors are configured to input the landmark image frame to one or more layers of the neural network.

9. The apparatus of claim 8, wherein the one or more processors are configured to:

input a first version of the landmark image frame to a first layer of the neural network, the first version of the landmark image frame having a first resolution; and input a second version of the landmark image frame to a second layer of the neural network occurring after the first layer, the second version of the landmark images frame having a second resolution that is lower than the first resolution.

10. The apparatus of claim 9, wherein the first and second layers of the neural network are convolutional layers.

11. The apparatus of claim 10, wherein the neural network includes a pooling layer between the first layer and the second layer, the pooling layer configured to:

downsample activation data output by the first layer to the second resolution of the second version of the landmark image frame;

receive the second version of the landmark image frame; and pass the downsampled activation data output by the first layer and the second version of the landmark image frame to the second layer.

12. The apparatus of claim 1, wherein the one or more processors are configured to train the neural network using a set of training data including:

a plurality of image frames corresponding to a plurality of faces of people, the plurality of image frames being labeled with facial expressions associated with the plurality of faces of people; and a plurality of landmark feature information associated with the plurality of image frames.

13. The apparatus of claim 1, wherein the three-dimensional model includes a three-dimensional morphable model (3DMM).

14. The apparatus of claim 1, wherein the apparatus includes a camera system that captures the image frame corresponding to the face of the person.

15. The apparatus of claim 1, wherein the apparatus includes a mobile device.

16. The apparatus of claim 1, further comprising a display.

17. A method for facial expression recognition, the method comprising:

receiving an image frame corresponding to a face of a person;

determining, based on a three-dimensional model of the face, landmark feature information associated with landmark features of the face, wherein the landmark feature information includes one or more blendshape coefficients determined based on the three-dimensional model;

inputting, to at least one layer of a neural network trained for facial expression recognition, the image frame and the landmark feature information;

determining, using the neural network, a facial expression associated with the face;

generating the three-dimensional model of the face; and determining the one or more blendshape coefficients based on a comparison between the three-dimensional model of the face and image data corresponding to the face within the image frame.

18. The method of claim 17, wherein:

the landmark feature information includes the one or more blendshape coefficients; and inputting the landmark feature information to the at least one layer of the neural network includes inputting the one or more blendshape coefficients to a fully-connected layer of the neural network.

19. The method of claim 18, wherein the fully connected layer concatenates the one or more blendshape coefficients with data output by a convolutional layer of the neural network.

20. The method of claim 17, further comprising generating, using the one or more blendshape coefficients, a landmark image frame indicating one or more landmark features of the face.

21. The method of claim 20, wherein generating the landmark image frame includes:

determining, based on the one or more blendshape coefficients, a plurality of landmark features of the face;

determining a subset of the plurality of landmark features that correspond to key landmark features; and generating the landmark image frame based on forming one or more connections between the subset of the plurality of landmark features that correspond to the key landmark features.

22. The method of claim 21, further comprising determining the subset of the plurality of landmark features that correspond to the key landmark features based on determining landmark features relevant to facial expressions of people.

23. The method of claim 22, wherein the landmark image frame includes a binary image frame that indicates pixels corresponding to the key landmark features using a predetermined pixel value.

24. The method of claim 20, wherein:
the landmark feature information includes the landmark image frame; and
inputting the landmark feature information to the at least one layer of the neural network includes inputting the landmark image frame to one or more layers of the neural network.

25. The method of claim 24, wherein inputting the landmark image frame to the one or more layers of the neural network includes:
inputting a first version of the landmark image frame to a first layer of the neural network, the first version of the landmark image frame having a first resolution; and
inputting a second version of the landmark image frame to a second layer of the neural network occurring after the first layer, the second version of the landmark images frame having a second resolution that is lower than the first resolution.

26. A non-transitory computer-readable storage medium for facial expression recognition, the non-transitory computer-readable storage medium comprising:
instructions stored therein which, when executed by one or more processors, cause the one or more processors to:
receive an image frame corresponding to a face of a person;
determine, based on a three-dimensional model of the face, landmark feature information associated with landmark features of the face, wherein the landmark feature information includes one or more blendshape coefficients determined based on the three-dimensional model;
input, to at least one layer of a neural network trained for facial expression recognition, the image frame and the landmark feature information;
determine, using the neural network, a facial expression associated with the face;
generate the three-dimensional model of the face; and
determine the one or more blendshape coefficients based on a comparison between the three-dimensional model of the face and image data corresponding to the face within the image frame.

27. A method for facial expression recognition, the method comprising:
receiving an image frame corresponding to a face of a person;
determining, based on a three-dimensional model of the face, landmark feature information associated with landmark features of the face, wherein the landmark feature information includes one or more blendshape coefficients determined based on the three-dimensional model;
inputting, to at least one layer of a neural network trained for facial expression recognition, the image frame and the landmark feature information;
determining, using the neural network, a facial expression associated with the face;
generating, using the one or more blendshape coefficients, a landmark image frame indicating one or more landmark features of the face.

* * * * *